(12) United States Patent
Morita et al.

(10) Patent No.: US 6,680,854 B2
(45) Date of Patent: Jan. 20, 2004

(54) SWITCHING POWER SUPPLY

(75) Inventors: Koichi Morita, Fujimi (JP); Toshiyuki Yamagishi, Kounosu (JP)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 10/222,476

(22) Filed: Aug. 16, 2002

(65) Prior Publication Data

US 2003/0043602 A1 Mar. 6, 2003

(30) Foreign Application Priority Data

Aug. 29, 2001 (JP) ....................... 2001-259303

(51) Int. Cl.[7] .............................................. H02M 3/335
(52) U.S. Cl. .......................................... 363/25; 363/23
(58) Field of Search ............................... 363/24, 25, 22, 363/23

(56) References Cited

U.S. PATENT DOCUMENTS 4,628,284 A * 12/1986 Bruning et al. ............... 331/86
5,684,680 A * 11/1997 Tahhan et al. ................ 363/26

FOREIGN PATENT DOCUMENTS

JP 8-154379 6/1996

* cited by examiner

*Primary Examiner*—Shawn Riley
(74) *Attorney, Agent, or Firm*—Woodcock Washburn LLP

(57) ABSTRACT

A switching power supply includes a transformer having a primary winding connected to a pair of a.c. input terminals via a rectifier circuit, and a secondary winding connected to a pair of d.c. output terminals via a rectifying and smoothing circuit. Connected between the pair of outputs of the rectifier circuit via an inductor, reverse-blocking diode, and part or whole of the transformer primary, a primary switch is turned on and off at a repetition frequency higher than the frequency of the a.c. input voltage. A soft-switching circuit is provided which comprises a serial connection of a transformer tertiary, an ancillary diode and an ancillary switch. This serial circuit is connected in parallel with the serial connection of the transformer primary and primary switch for zero-voltage switching of the primary switch.

14 Claims, 20 Drawing Sheets

SWITCHING POWER SUPPLY

BACKGROUND OF THE INVENTION

This invention relates to electric power supplies, and particularly to a switching power supply capable of a.c. to d.c. voltage conversion, featuring provisions for attainment of closer approximation of the input current waveform to a sinusoidal wave, and a higher power factor.

A conversion from an alternating to a direct current is possible by a rectifying and smoothing circuit comprising a rectifying circuit having a diode connected to an a.c. power supply, and a smoothing capacitor connected to the rectifying circuit. This type of rectifying and smoothing circuit possesses the disadvantage, however, of a somewhat poor power factor as a result of the fact that the smoothing capacitor is charged only at or adjacent the peaks of the a.c. voltage of sinusoidal waveform. Another drawback is that it is incapable of adjustably varying the d.c. output voltage.

Japanese Unexamined Patent Publication No. 8-154379 represents an improvement of the rectifying and smoothing circuit above. It teaches a switching power supply comprising a rectifying circuit, a smoothing capacitor, a d.c.-to-d.c. converter circuit, and an inductive reactor for a higher power factor. The reactor is electrically connected between the pair of output terminals of the rectifying circuit upon closure of a switch included in the d.c.-to-d.c. converter circuit. The desired improvement in power factor is thus attained, as the current flowing through the reactor varies in amplitude in step with the a.c. input voltage.

Despite its undisputable advantages, this prior art switching power supply has proved to be not so satisfactory as can be desired in terms of power loss.

SUMMARY OF THE INVENTION

The present invention seeks to improve the switching power supply of the noted prior art type for still higher efficiency without impairment of its inherent advantages.

Briefly, the invention may be summarized as a switching power supply capable of translating a.c. voltage into d.c. voltage. Included is a transformer connected to a pair of a.c. input terminals via a rectifier circuit, and to a pair of d.c. output terminals via a rectifying and smoothing circuit. The rectifier circuit has a first and a second output, the second being grounded in the preferred embodiments disclosed herein. A smoothing capacitor is connected between a first extremity of the primary winding of the transformer and the second output of the rectifier circuit, and an inductor between the first output of the rectifier circuit and the smoothing capacitor via at least part of the transformer primary. A primary switch is connected between a second extremity of the transformer and the second output of the rectifier circuit. The primary switch is provided with soft-switching capacitance means which can take the form of either a discrete capacitor connected in parallel therewith or parasitic capacitance of its own.

The invention particularly features a soft-switching circuit which comprises an additional winding of the transformer, and an ancillary switch connected in parallel with the smoothing capacitor at least via the additional transformer winding. The ancillary switch is designed to supply to the additional transformer winding a current of sufficient magnitude to cause the transformer primary to develop a voltage that enables the soft-switching capacitance means to discharge. A switch control circuit is connected both to the primary switch for on-off control of the primary switch at a repetition frequency higher than the frequency of the a.c. input voltage, and to the ancillary switch in order to initiate conduction through the ancillary switch earlier than the beginning of each conducting period of the primary switch and to terminate conduction through the ancillary switch not later than the end of each conducting period of the primary switch.

Such being the improved construction of the switching power supply according to the invention, a current will flow through the inductor during the conducting periods of the primary switch. Improvements in power factor and input waveform are accomplished as the inductor current has an amplitude in proportion with that of the a.c. input voltage.

The conduction of the ancillary switch, on the other hand, will result in current flow through the additional transformer winding, which is a tertiary in the preferred embodiments. Then a sufficient voltage will develop across the transformer primary to cause the soft-switching capacitance means to discharge, with a consequent drop in the voltage across the primary switch. A zero-voltage turn-on of the primary switch is thus realized for reduction of switching loss and noise.

The primary switch operates both for improvements in power factor and input waveform and for d.c.-to-d.c. conversion. The objectives of improved power factor and improved input waveform in view are thus attained with little or no addition to the size or manufacturing cost of the switching power supply.

It will also be appreciated that the winding included in the soft switching circuit is incorporated with the transformer as a tertiary in the preferred embodiments. This feature also contributes to the compactness of the device.

A further feature of the invention resides in an ancillary charging circuit connected between a third output of the rectifier circuit and the smoothing capacitor. The third output of the rectifier circuit puts out substantially the same rectifier output voltage between itself and the noted second output of the rectifier circuit as that between the first and the second output thereof. The ancillary charging circuit comprises another ancillary winding (quaternary in the preferred embodiments) of the transformer. Various specific designs will be proposed for the ancillary charging circuit.

The ancillary charging circuit is well calculated to charge the smoothing capacitor to the required degree even if the current through the primary inductor, which is for improvements in power factor and input waveform, is lessened in magnitude. The smoothing capacitor is charged both via the primary inductor and via the ancillary charging circuit. As a result, the current charging the smoothing capacitor via the primary inductor can be made less by an amount equal to the current charging the smoothing capacitor via the ancillary charging circuit than if the smoothing capacitor were charged via the primary inductor only. Power loss at the primary inductor is thus decreased, and its size can be reduced.

The ancillary charging circuit may also be utilized to make higher the voltage under which the smoothing capacitor is charged. This will serve to prevent the flow of overcurrent into the smoothing capacitor via the primary inductor at or adjacent the peaks of the a.c. input voltage. The result will be the reduction of higher harmonics of the a.c. input voltage.

An additional advantage of the ancillary charging circuit is that it makes use of an ancillary winding of the transformer. The ancillary charging circuit can therefore be most simplified in construction and reduced in size.

The transformer primary is tapped in some preferred embodiments of the invention, and the primary inductor is connected between the first output of the rectifier circuit and the smoothing capacitor via part of the transformer primary. Current will then flow through the primary inductor only when its input voltage is higher than the tap voltage, resulting in less power loss at the primary inductor.

In other embodiments, however, the transformer primary is not tapped, and the primary inductor is connected between the rectifier circuit first output and the smoothing capacitor via whole of the transformer primary. This connection is recommended where higher power factor and better input waveform are more important than efficiency, cause then the current through the primary inductor is not limited by the transformer primary.

The above and other objects, features and advantages of this invention will become more apparent, and the invention itself will best be understood, from a study of the following description and appended claims, with reference had to the attached drawings showing the preferred embodiments of the invention.

DESCRIPTION OF THE PREFERRED EMBODIMENTS

Figure 1:
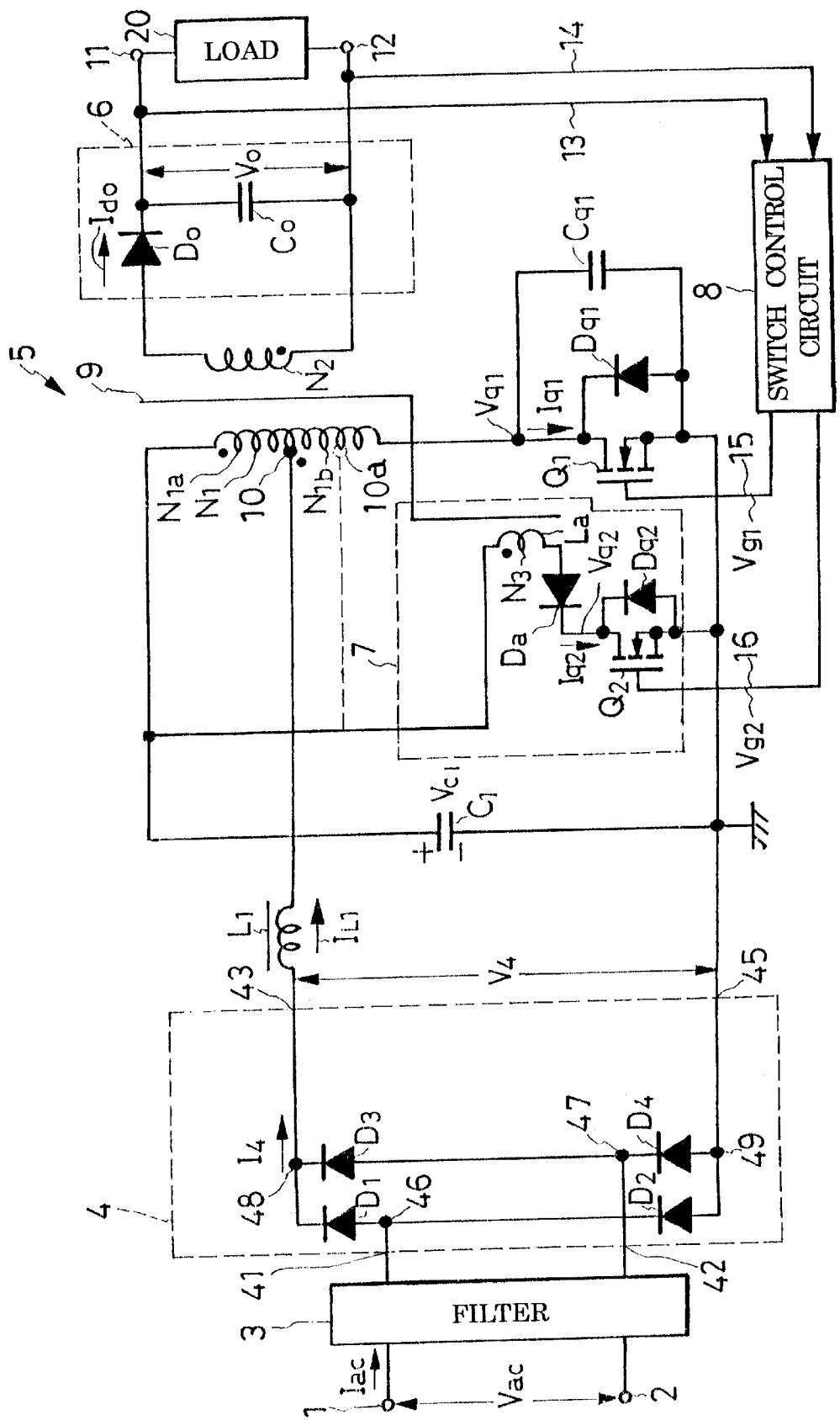
FIG. 1 is a schematic electrical diagram of a first preferred form of switching power supply according to the invention.

The switching power supply shown in FIG. 1 by way of a preferable embodiment of the invention has a pair of input terminals 1 and 2 which are to be connected to a source, not shown, of commercial a.c. voltage $V_{ac}$ with a frequency of, for instance, 50 Hz. A noise filter 3 is connected to this pair of input terminals 1 and 2. The noise filter 3 can be of the conventional make comprising inductors and capacitors for removal of high-frequency noise from the incoming fixed-frequency alternating current.

The noise filter 3 is connected to a rectifier circuit 4 having four diodes $D_1$, $D_2$, $D_3$ and $D_4$. The first diode $D_1$ has its anode connected to the cathode of the second diode $D_2$, and its connected to the cathode of the third diode $D_3$. The anode of the second diode $D_2$ is connected to that of the fourth diode $D_4$. The anode of the third diode $D_3$ is connected to the cathode of the fourth diode $D_4$. The noise filter 3 has a first output conductor 41 connected to a junction 46 between the first and second diodes $D_1$ and $D_2$, and a second output conductor 42 connected to a junction 47 between the third and fourth diodes $D_3$ and $D_4$.

The rectifier circuit 4 has two output conductors 43 and 45. The first output conductors 43 is connected to a junction 48 between the cathodes of the first and third diodes $D_1$ and $D_3$. The second output conductor 45 is connected to a junction 49 between the anodes of the second and fourth diodes $D_2$ and $D_4$. It will be observed that the second rectifier output conductor 45 is grounded and will therefore be sometimes referred to as such.

At 5 is shown a transformer having a primary winding $N_1$, a secondary winding $N_2$, and, according to a feature of this invention, a tertiary or ancillary winding $N_3$, all wound around a magnetic core 9 and electro-magnetically coupled together. The transformer primary $N_1$ is tapped at 10 and thereby divided into two parts $N_{1a}$ and $N_{1b}$. The three transformer windings $N_1$, $N_2$ and $N_3$ are polarized as marked with the dots in FIG. 1. It will be seen from the markings that the transformer primary $N_1$ and secondary $N_2$ are opposite in polarity.

A smoothing capacitor $C_1$, preferably an electrolytic capacitor, is connected between one extremity of the transformer primary $N_1$ and the grounded second output conductor 45 of the rectifier circuit 4. An inductor $L_1$ has one extremity thereof connected to the first rectifier output conductor 43, and the other extremity to the tap 10 on the transformer primary $N_1$, so that the inductor is connected to the smoothing capacitor $C_1$ via the first part $N_{1a}$ of the transformer primary $N_1$. The position of the tap 10 on the transformer primary $N_1$ is variable as required or desired. Generally, the smaller the ratio of the transformer primary first part $N_{1a}$ to the transformer primary second part $N_{1b}$, the higher will this power supply be in efficiency, but, at the same time, the less in power factor.

Shown as an insulated-gate field-effect transistor, a primary switch $Q_1$ is connected between the other extremity of the transformer primary $N_1$ and the second rectifier output conductor 45. The smoothing capacitor $C_1$ is in parallel with this primary switch $Q_1$ via the transformer primary $N_1$.

Also connected in parallel with the primary switch $Q_1$ is a soft-switching capacitor $C_{q1}$ which is less in capacitance than the smoothing capacitor $C_1$. Although the soft-switching capacitor $C_{q1}$ is shown as a discrete unit, the functions intended therefor could be served by the parasitic capacitance between the drain and source of the primary switch $Q_1$.

A diode $D_{q1}$ is connected reversely in parallel with the primary switch $Q_1$ for its protection. The showing of this switch protection diode $D_{q1}$ as a discrete unit is also by way of example only. The functions intended for this diode could be served by the so-called body diode of the primary switch $Q_1$.

The transformer secondary $N_2$ has its opposite extremities connected respectively to the pair of output terminals 11 and 12 via a rectifying and smoothing circuit 6. The rectifying and smoothing circuit 6 comprises a rectifying diode $D_0$ and a smoothing capacitor $C_0$. Connected between one extremity of the transformer secondary $N_2$ and the output terminal 11, the rectifying diode $D_0$ is so oriented as to be conductive when the primary switch $Q_1$ is off, and nonconductive when the primary switch $Q_1$ is on. The capacitor $C_0$ is connected in parallel with the transformer secondary $N_2$ via the diode $D_0$. A unidirectional output voltage is thus obtained between the pair of output terminals 11 and 12 for feeding a load 20 connected thereto.

The present invention particularly features a soft-switching circuit 7 comprising an ancillary switch $Q_2$ and two ancillary diodes $D_a$ and $D_{q2}$, in addition to the noted transformer tertiary $N_3$. This transformer tertiary is so polarized that the current flowing therethrough may cause a voltage to be developed across the transformer primary $N_1$ with consequent discharge of the soft-switching capacitor $C_{q1}$. The transformer tertiary $N_3$ has leakage inductance $L_a$. An additional inductor, not shown, may be connected in series with the transformer tertiary $N_3$ in cases where the leakage inductance $N_a$ fails to provide a required amount of inductance.

The transformer tertiary $N_3$, ancillary reverse-blocking diode $D_a$ and ancillary switch $Q_2$ are connected in series with one another. This serial connection is connected in parallel with the smoothing capacitor $C_1$ and also with the serial connection of the transformer primary $N_1$ and primary switch $Q_1$. Shown as a field-effect transistor, the ancillary switch $Q_2$ has an inbuilt parallel diode $D_{q2}$ which is so oriented as to permit flow of reverse current. The ancillary switch $Q_2$ is understood to possess parasitic capacitance between its drain and source. The ancillary diode $D_a$ is so oriented as to be forward-biased by the voltage induced across the transformer tertiary $N_3$ during the nonconducting periods of the primary switch $Q_1$.

As shown also in FIG. 1, a switch control circuit 8 has inputs connected to the pair of output terminals 11 and 12 by way of conductors 13 and 14, respectively, and an output connected to the control input of the primary switch $Q_1$ by way of a conductor 15, and another output connected to the control input of the ancillary switch $Q_2$ by way of a conductor 16. It is understood that the switch control circuit 8 is additionally connected to the sources of both switches $Q_1$ and $Q_2$, such connections being not specifically indicated in the drawings because of their impertinence to the instant invention. The switch control circuit 8 puts out a primary switch control signal $V_{g1}$ for on-off control of the primary switch $Q_1$, and an ancillary switch control signal $V_{g2}$ for on-off control of the ancillary switch $Q_2$.

Figure 2:
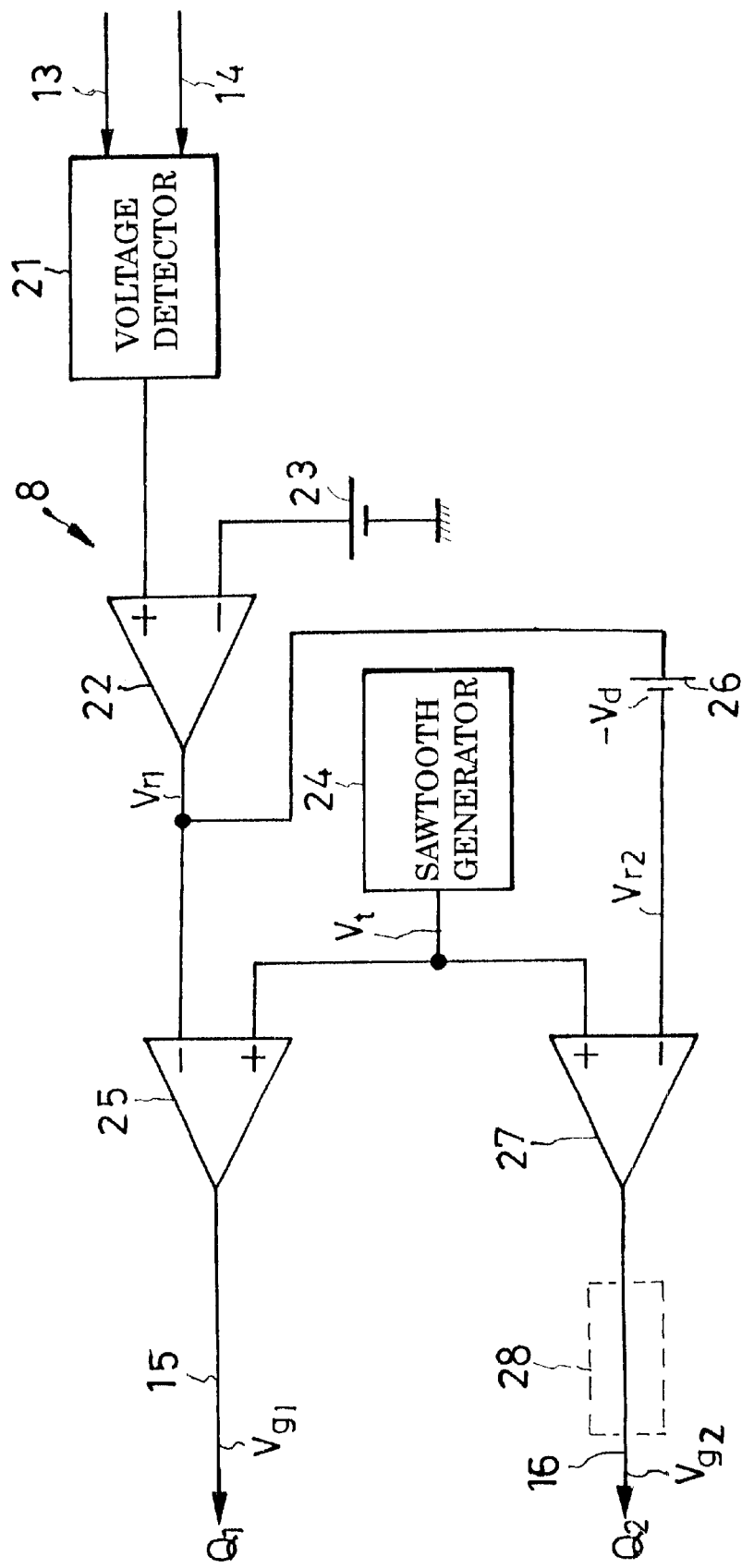
FIG. 2 is a schematic electrical diagram, partly in block form, showing in more detail the switch control circuit included in the FIG. 1 switching power supply.

FIG. 2 is a more detailed illustration of the switch control circuit 8. Included is a output voltage detector circuit 21 which is connected to the pair of input conductors 11 and 12, FIG. 1, by way of the conductors 13 and 14 for putting out a voltage proportional to the output voltage $V_o$ of this power supply. The output of the output voltage detector circuit 21 is connected to one input of a differential amplifier 22, the other input of which is connected to a reference voltage source 23. The output of the differential amplifier 22 is connected both to one input of a first comparator 25 and, via a level-setting voltage source 26, to one input of a second comparator 27. The other inputs of the comparators 25 and 27 are both connected to a sawtooth generator circuit 24. The output of the first comparator 25 is connected to the control terminal of the primary switch $Q_1$, FIG. 1, by way of the output conductor 15. The output of the second comparator 27 is connected to the control input of the of the ancillary switch $Q_2$ by way of the output conductor 16.

As required or desired, the differential amplifier 22 could be coupled photoelectrically to both comparator 25 and level-setting circuit 26. The output voltage detector circuit 21 could also be coupled photoelectrically to the differential amplifier 22.

Inputting the output voltage of the output voltage detector circuit 21 and the reference voltage from its source 23, the differential amplifier 22 puts out the difference $V_{r1}$ therebetween for delivery to the first comparator 25. This first comparator 25 compares the incoming difference voltage $V_{r1}$ with the sawtooth voltage $V_t$ from the sawtooth generator 24, as indicated at (A) in FIG. 3 and puts out a series of duration-modulated switch control pulses $V_{g1}$ shown at (B) in the same figure. The duration-modulated switch control pulses $V_{g1}$ are delivered over the first output conductor 15 to the gate of the primary switch $Q_1$, making its on-off control accordingly.

The level-setting power supply 26 has a voltage set at $-V_d$, such that the voltage $V_{r2}$ on its output side is less than the differential amplifier output voltage $V_{r1}$ by $V_d$. The second comparator 27 compares this voltage $V_{r2}$ with the sawtooth voltage $V_t$, as indicated also at (A) in FIG. 3, and puts out another series of duration-modulated switch control pulses $V_{g2}$, shown at (C) in FIG. 3, which are greater in duration than the primary switch control pulses $V_{g2}$. The second series of duration-modulated switch control pulses $V_{g2}$ are delivered over the second output conductor 16 to the gate of the ancillary switch $Q_2$.

Figure 4:
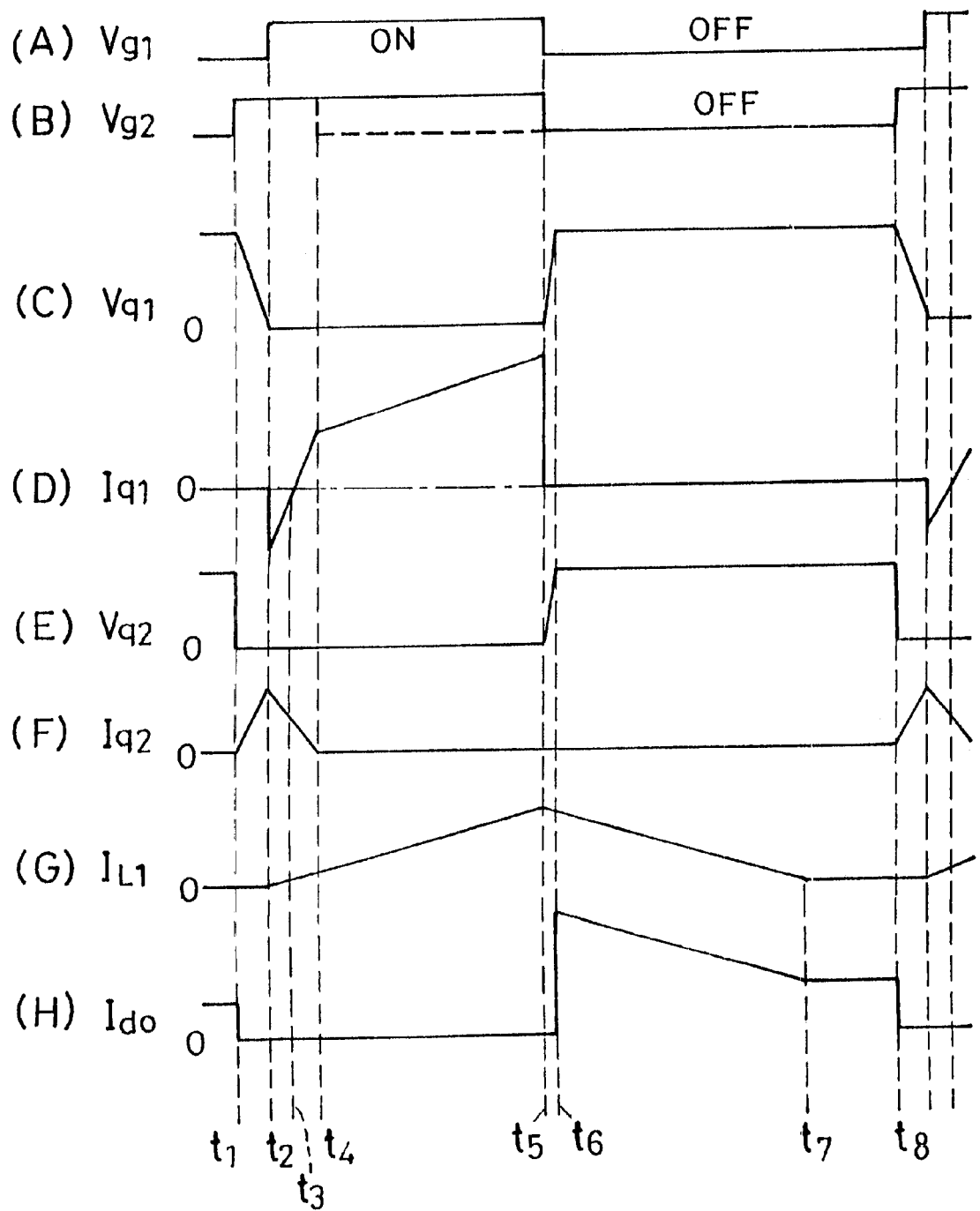
FIG. 4, consisting of (A) through (H), is a series of diagrams showing the voltage and current waveforms appearing in various parts of the FIG. 1 switching power supply.

The primary switch control pulses $V_{g1}$ and ancillary switch control pulses $V_{g2}$ produced as above by the switch control circuit 8 are shown also at (A) and (B) in FIG. 4. It will be observed from this figure that each ancillary switch control pulse $V_{g2}$ rises, as at $t_1$, thereby initiating conduction through the ancillary switch $Q_2$ when the primary switch $Q_1$ is off. Each primary switch control pulse $V_{g1}$ rises, as at $t_2$, thereby initiating conduction through the primary switch $Q_1$ shortly after the conduction of the ancillary switch $Q_2$. The time interval from $t_1$ to $t_2$ is so determined as to minimize switching loss when the primary switch $Q_1$ is turned on.

Figure 3:
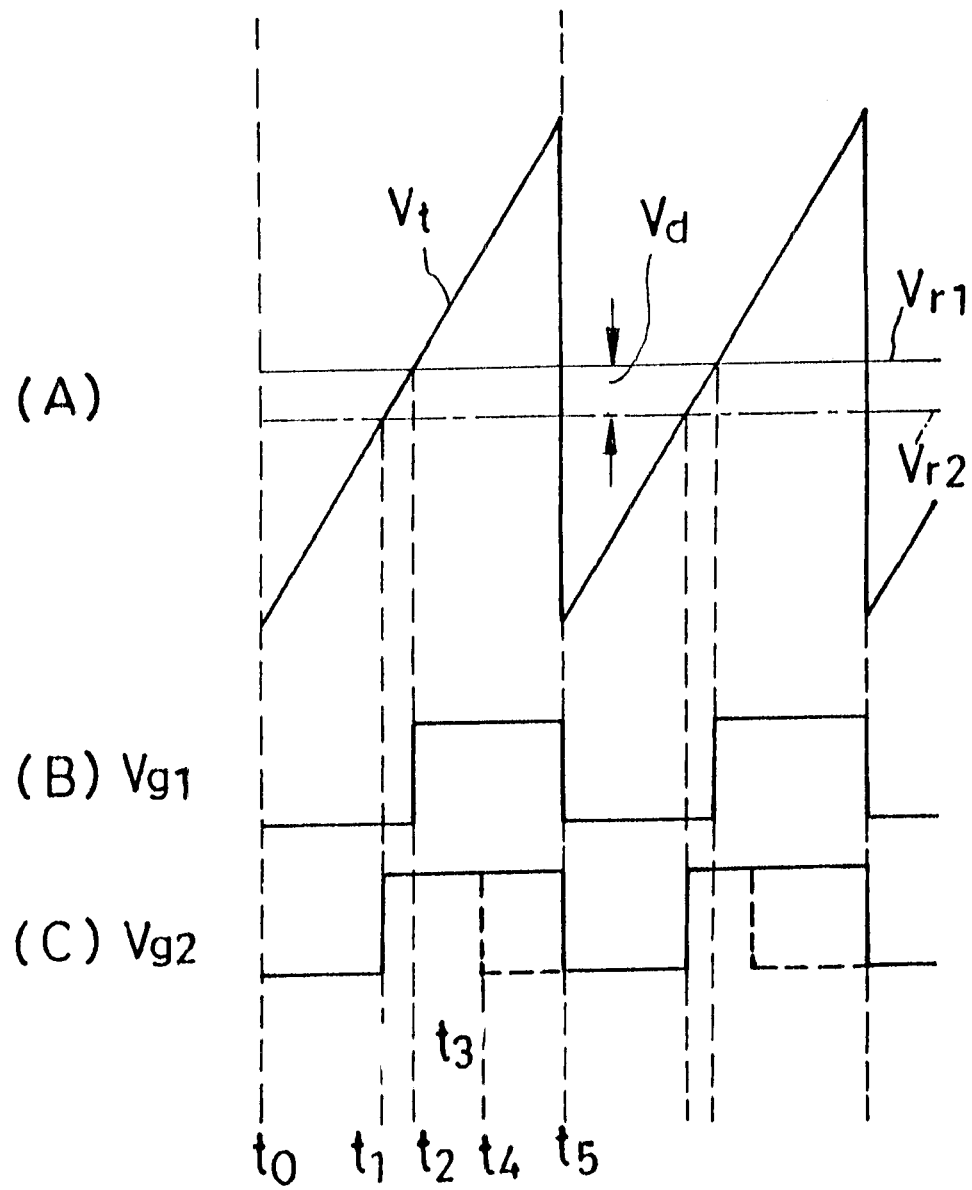
FIG. 3, consisting of (A) through (C), is a series of diagrams showing the voltage and current waveforms appearing in various parts of the FIG. 2 switch control circuit.

Both primary switch $Q_1$ and ancillary switch $Q_2$ are shown to turn off at the same moment, as $t_5$ in both FIGS. 3 and 4. This showing is not mandatory, however. The ancillary switch $Q_2$ could be turned off at any moment from $t_4$, when the current $I_{q2}$ through the ancillary switch $Q_2$ drops to zero as at (F) in FIG. 4, and $t_5$, when the primary switch $Q_1$ goes off. For turning off the ancillary switch $Q_2$ at $t_4$, for instance, as indicated by the broken line at (B) in FIG. 4, a monostable multivibrator may be connected to the output of the second comparator 27 of the switch control circuit 8, as indicated by the dashed outline labeled 28 in FIG. 2. This MMV 28 may be caused to produce pulses each lasting as from $t_1$ to $t_4$ in FIG. 4.

Operation

In use of the FIG. 1 power supply the pair of a.c. input terminals 1 and 2 are to be connected to an unshown source of a.c. power, and the pair of d.c. output terminals 11 and 12 to the desired load 20. The smoothing capacitor $C_1$ will be charged to the desired d.c. voltage $V_{c1}$ as the switch $Q_1$ is turned on and off by the switch control circuit 8. The resulting steady-state operation of this representative switching power supply will be discussed hereinbelow with reference to FIGS. 4 and 5 which show the voltage and current waveforms appearing in various parts of the FIG. 1 circuitry.

Figure 5:
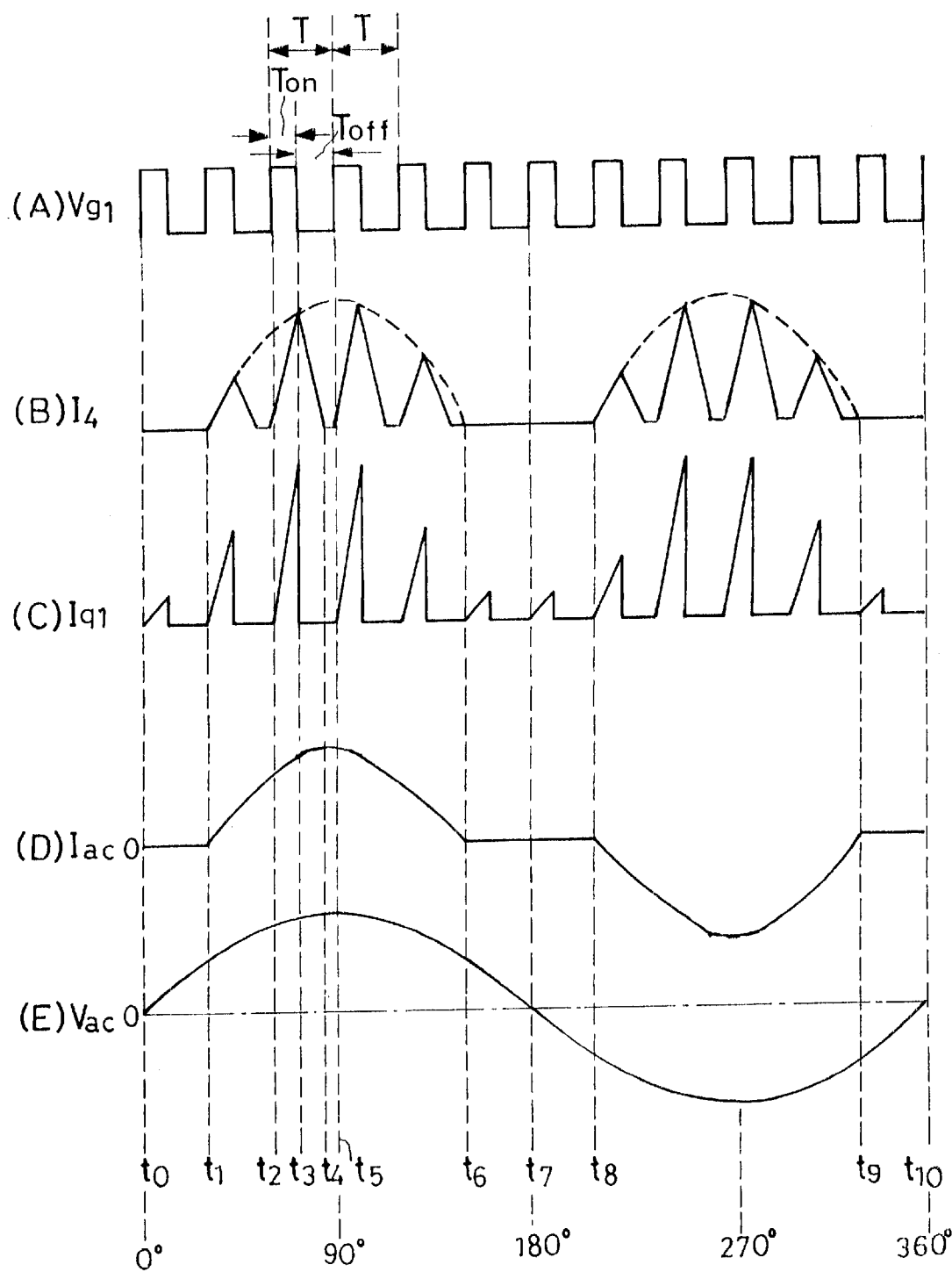
FIG. 5, consisting of (A) through (E), is a series of diagrams showing on a different time scale the voltage and current waveforms appearing in various parts of the FIG. 1 device.

FIG. 5 is explanatory of how the invention achieves improvements in power factor and input waveform. At (A) in this figure are shown the series of switch control pulses $V_{g1}$ applied by the switch control circuit 8 to the primary switch $Q_1$. The primary switch $Q_1$ will be turned on and off during each cycle T of the switch control signal consisting of one pulse, as from $t_2$ to $t_3$, and one space between such pulses, as from $t_3$ to $t_4$. The repetition rate of these switch control pulses $V_{g1}$ is now assumed to be 20 kHz. It is also understood that the 50 Hz sinusoidal a.c. voltage $V_{ac}$, (E) in FIG. 5, is now applied between the pair of a.c. input terminals 1 and 2.

As the primary switch $Q_1$ is repeatedly turned on and off, the amplitudes or peak values of the output current $I_4$ of the rectifier circuit 4 and the current $I_{q1}$ through the primary switch $Q_1$ will change, as at (B) and (C) in FIG. 5, in conformity with the amplitude of the a.c. input voltage $V_{ac}$. Thus the a.c. input current $I_{ac}$ shown at (D) in FIG. 5 will closely approximate a sinusoidal wave, with consequent improvement in power factor and waveform. It is to be noted that the primary inductor $L_1$ is connected to the tap 10 of the transformer primary $N_1$. As a result, there will be no flow of the primary inductor current $I_{L1}$ unless the rectifier output voltage $V_4$ becomes higher than the tap voltage due to the voltage $V_{c1}$ across the smoothing capacitor $C_1$. The rectifier output current $I_4$ and a.c. input current $I_{ac}$ are both shown to flow from $t_1$ to $t_6$ and from $t_8$ to $t_9$ at (B) and (D) in FIG. 5.

The operation of the FIG. 1 power supply exclusive of the soft-switching circuit 7 will be explained in some more detail. A current will flow through the path comprising the rectifier circuit 4, primary inductor $L_1$, second part $N_{1b}$ of the transformer primary $N_1$, and primary switch $Q_1$ during the conducting periods $T_{on}$ of the primary switch $Q_1$, as from $t_2$ to $t_3$ in FIG. 5. A current will flow at the same time through the path comprising the smoothing capacitor $C_1$, transformer primary $N_1$, and primary switch $Q_1$. The voltage developing across the transformer secondary $N_2$ during these primary switch conducting periods $T_{on}$ will be oriented to reverse-bias the diode $D_0$, holding the same nonconductive. Energy will therefore be stored on the transformer 5 during the primary switch conducting periods $T_{on}$, as well as on the primary inductor $L_1$.

On the other hand, during the nonconducting periods $T_{off}$ of the primary switch $Q_1$, as from $t_3$ to $t_5$ in FIG. 5, both primary inductor $L_1$ and transformer 5 will release the energy they have stored during the previous primary switch conducting period $T_{on}$, causing the flow of the current $I_4$ through the path comprising the rectifier circuit 4, primary inductor $L_1$, first part $N_{1a}$ of the transformer primary $N_1$, and smoothing capacitor $C_1$. This capacitor $C_1$ will therefore be charged.

The current $I_4$ charging the smoothing capacitor $C_1$ during each primary switch nonconducting period $T_{off}$ will diminish with time and become zero as at $t_4$ in FIG. 5. During these nonconducting periods $T_{off}$, due to energy release from the transformer 5, there will be induced across the transformer secondary $N_2$ a voltage oriented to cause conduction through the diode $D_0$ of the rectifying and smoothing circuit 6. The capacitor $C_0$ and load 18 will both be powered through the diode $D_0$.

One cycle of switching operation, lasting as from $t_2$ to $t_5$ in FIG. 5, has now come to an end. The same cycle will repeat itself after $t_5$ when the primary switch $Q_1$ is closed again. The power supply output voltage $V_0$ may exceed a predefined limit in the course of such repetition of switching cycles. Thereupon the switch control circuit 8 will respond by shortening the primary switch conducting periods $T_{on}$ to an extent necessary to return the power supply output voltage $V_0$ to normal. The switch control circuit 8 will also respond to an excessive drop in the power supply output voltage $V_0$, by making the primary switch conducting periods $T_{on}$ longer until the output voltage returns to normal.

Reference is now invited to FIG. 4 again for a study of how the soft-switching circuit 7 functions for the soft switching of the primary switch $Q_1$. As will be noted from (A) and (B) in FIG. 4, which show the primary switch control pulses $V_{g1}$ and ancillary switch control pulses $V_{g2}$, both primary switch $Q_1$ and ancillary switch $Q_2$ are off before $t_1$ in FIG. 4. Therefore, as in the $t_3$–$t_5$ period in FIG. 5, the diode current $I_{do}$ will flow as at (H) in FIG. 4, and the voltage $V_{q1}$ across the primary switch $Q_1$ and the voltage $V_{q2}$ across the ancillary switch $Q_2$ will be both held high before $t_1$ as at (C) and (E) in FIG. 4.

The ancillary switch $Q_2$ is shown turned on at $t_1$ by the ancillary switch control signal $V_{g2}$, (B) in FIG. 4. The current $I_{q2}$ will then flow as at (F) in FIG. 4 through the path comprising the smoothing capacitor $C_1$, transformer tertiary $N_3$, ancillary diode $D_a$, and ancillary switch $Q_2$. The flow of the current $I_{q2}$ through the transformer tertiary $N_3$ will cause a voltage to be developed across the transformer secondary $N_2$, such that the output rectifier diode $D_0$ will be reverse-biased. The current $I_{d0}$ through the diode $D_0$ will become zero, as at (H) in FIG. 4, upon nonconduction of the diode $D_0$. The clamping of the transformer primary $N_1$ via the transformer secondary $N_2$ will thus be eliminated.

Due to the current flow through the transformer tertiary $N_3$, moreover, the transformer primary $N_1$ will develop a voltage that is oriented opposite to the voltage across the smoothing capacitor $C_1$. Then the soft-switching capacitor $C_{q1}$ will discharge through the path comprising the transformer primary $N_1$, tertiary $N_3$, ancillary diode $D_a$, an ancillary switch $Q_2$. The voltage $V_{q1}$ across the primary switch $Q_1$ will diminish until it becomes zero at $t_2$, as at (C) in FIG. 4. Since the transformer tertiary $N_3$ connected in series with the ancillary switch $Q_2$ possesses inductance $L_a$, the current discharged by the soft-switching capacitor $C_{q1}$ will flow by the resonance of the capacitance of the capacitor $C_{q1}$ and the inductance $L_a$ of the transformer tertiary $N_3$. The current $I_{q2}$ through the ancillary switch $Q_2$ will start rising from $t_1$, as at (F) in FIG. 4. It is thus seen that the zero-current switching of the ancillary switch $Q_2$ is accomplished at $t_1$, with little or no power loss when this switch is turned on.

Upon completion of discharge by the soft-switching capacitor $C_{q1}$ at $t_2$, the currents $I_{q1}$ and $I_{q2}$ shown at (D) and (F) in FIG. 4 will start flowing along the path comprising the transformer tertiary $N_3$, first ancillary diode $D_a$, ancillary switch $Q_2$, primary switch protection diode $D_{q1}$, and transformer primary $N_1$, due to the liberation of the energy that has been stored on the inductance $L_a$ of the transformer tertiary $N_3$. The current $I_{q2}$ through the ancillary switch $Q_2$ will start dwindling at $t_2$, and so will the current through the primary switch protection diode $D_{q1}$. The current $I_{q1}$ is shown at (D) in FIG. 4 as the sum of the current through the primary switch $Q_1$ and the current through its protection diode $D_{q1}$. However, this current $I_{q1}$ will be collectively referred to as the primary switch current for simplicity.

The voltage $V_{c1}$ across the smoothing capacitor $C_1$ will be impressed to the transformer primary $N_1$ at $t_2$ when the primary switch $Q_1$ is turned on or when the primary switch protection diode $D_{q1}$ conducts. The energy stored on the inductance $L_a$ of the transformer tertiary $N_3$ will be released through the path comprising the first ancillary diode $D_a$, ancillary switch $Q_2$, and smoothing capacitor $C_1$ as well. The current $I_{q1}$ through the primary switch protection diode $D_{q1}$, that is, through the primary switch $Q_1$ will become zero at $t_3$. Since the primary switch protection diode $D_{q1}$ is conductive from $t_2$ to $t_3$ in FIG. 4, the voltage $V_{q1}$ across the primary switch $Q_1$ will be approximately zero during this period. The primary switch $Q_1$ may therefore be turned on at zero voltage during the $t_2$–$t_3$ period. The primary switch control signal $V_{g1}$ is shown to go high at $t_2$ at (A) in FIG. 4. However, in consideration of possible fluctuations in the moment the primary switch $Q_1$ is turned on in practice, this switch may preferably be turned on midway between $t_2$ and $t_3$.

It must nevertheless be pointed out that the primary switch $Q_1$ may be turned on before $t_2$ when the voltage $V_{q1}$ across the same becomes zero, and not earlier than $t_1$ when it starts dwindling. Switching loss will then diminish to an extent to which the voltage $V_{q1}$ has dropped at the moment the primary switch is turned on.

Some reduction of switching loss is also possible if the primary switch $Q_1$ is turned on shortly after $t_3$. With the primary switch $Q_1$ held open at $t_3$, the resonance capacitor $C_{q1}$ will start to be charged at that moment. But if the primary switch $Q_1$ is turned on while the voltage across this capacitor $C_{q1}$ is still less than the voltage $V_{q1}$ across the primary switch during its nonconducting periods, then a corresponding reduction of the switching loss will be realized. Broadly speaking, therefore, the primary switch $Q_1$ may be turned on at any moment after $t_1$ when the ancillary switch $Q_2$ conducts, provided that the voltage $V_{q1}$ across the primary switch is less than that during the nonconducting period before $t_1$.

Since FIG. 4 is explanatory of what is taking place from $t_1$ to $t_6$ in FIG. 5, the primary switch protection diode $D_{q1}$ is understood to conduct at $t_2$ in FIG. 4. Then the current $I_{L1}$ through the first inductance coil $L_1$ will start increasing as at (G) in FIG. 4.

At $t_3$, when the primary switch protection diode $D_{q1}$ becomes incapable of being held conductive, the current $I_{q1}$ through the primary switch $Q_1$ will become zero and thereafter start flowing positive as at (D) in FIG. 4. Thus, during the ensuing $t_3$–$t_4$ period, the primary switch current $I_{q1}$ will flow along both the path comprising the rectifier circuit 4, primary inductor $L_1$, second part $N_{1b}$ of the transformer primary $N_1$, and primary switch $Q_1$, and the path comprising the smoothing capacitor $C_1$, transformer primary $N_1$, and primary switch $Q_1$.

It is understood that energy release from the inductance $L_a$ of the transformer tertiary $N_3$ comes to an end at $t_4$, rather than at $t_3$, in this particular embodiment. For this reason, during the $t_3$–$t_4$ period, the current $I_{q2}$ will flow as at (F) in FIG. 4 along the path comprising the transformer tertiary $N_3$, first ancillary diode $D_a$, ancillary switch $Q_2$, and smoothing capacitor $C_1$. The rectifying diode $D_0$ will be reverse biased by the voltage building up across the transformer secondary $N_2$ when the primary switch current $I_{q1}$ is going positive as from $t_3$ to $t_4$, and from $t_4$ to $t_5$, in FIG. 4. The current $I_{do}$ through this diode $D_0$ will therefore remain zero as at (H) in FIG. 4, and the energy will be stored on the transformer 5.

The current $I_{q2}$ through the ancillary switch $Q_2$ will be zero as at (F) in FIG. 4, whereas the current $I_{q1}$ through the primary switch $Q_1$ will flow as at (D) in FIG. 4, from $t_4$ to $t_5$. During this period, as from $t_3$ to $t_4$, there will be current flow both along the first path comprising the first a.c. input terminal 1, filter 3, first diode $D_1$, inductor $L_1$, second part $N_{1b}$ of the transformer primary $N_1$, primary switch $Q_1$, fourth diode $D_4$, filter 3, and second a.c. input terminal 2, and along the second path comprising the smoothing capacitor $C_1$, transformer primary $N_1$, and primary switch $Q_1$. The current on the first path is for improvements in power factor and input waveform and equivalent to the first inductance coil current $I_{L1}$ shown at (G) in FIG. 4. The current on the second path is for d.c. to d.c. conversion. The current $I_{do}$ through the diode $D_0$ will be zero from $t_4$ to $t_5$ as at (H) in FIG. 4, so that energy will be stored on the transformer 5 during this period.

During the $t_4$–$t_5$ period, owing to the voltage across the transformer primary $N_1$, there will be induced across the transformer tertiary $N_3$ a voltage that is opposite in orientation to the voltage $V_{c1}$ across the smoothing capacitor $C_1$. The ancillary diode $D_a$ will therefore be nonconductive. The voltage $V_{q2}$ across the ancillary switch $Q_2$ will be zero as at (E) in FIG. 4, and so will be the current $I_{q2}$ through the ancillary switch $Q_2$. The ancillary switch $Q_2$ may therefore be turned off at any moment during this $t_4$–$t_5$ period for both zero-voltage and zero-current switching.

The conduction control of the ancillary switch $Q_2$ is shown to end at $t_5$ when that of the primary switch $Q_1$ also ends, in this particular embodiment of the invention. The zero-voltage and zero-current switching of the ancillary switch $Q_2$ is thus accomplished for reduction of switching loss when the ancillary switch is turned off. In practice, of course, the ancillary switch $Q_2$ may be turned off at $t_4$, as indicated by the broken line at (B) in FIG. 4, or at any other moment from $t_4$ to $t_5$.

As plotted at (D) in FIG. 4, the current $I_{q1}$ through the primary switch $Q_1$ will drop to zero at $t_5$ when this switch is turned off. The current will flow instead into the soft-switching capacitor $C_{q1}$ thereby charging the same. The voltage $V_{q1}$ across the primary switch $Q_1$ will rise with a gradient as at (C) in FIG. 4. The zero-voltage turnoff of the primary switch $Q_1$ has thus been achieved. The current charging the soft switching capacitor $C_{q1}$ as above will flow both along the path comprising the rectifier circuit 4, inductor $L_1$, second part $N_{1b}$ of the transformer primary $N_1$, and soft switching capacitor $C_{q1}$, and along the path comprising the smoothing capacitor $C_1$, transformer primary $N_1$, and soft switching capacitor $C_{q1}$.

The inductor $L_1$ and transformer 5 will both release their energy during the ensuing $t_6$–$t_7$ period. The diode $D_0$ of the rectifying and smoothing circuit 6 will then be forward biased by the voltage across the transformer secondary $N_2$, so that the diode current $I_{do}$ will flow as at (H) in FIG. 4. The smoothing capacitor $C_1$ will be charged through the current path comprising the rectifier circuit 4, inductor $L_1$, first part $N_{1a}$ of the transformer primary $N_1$, and smoothing capacitor $C_1$.

As indicated at (G) in FIG. 4, the current $I_{L1}$ through the inductor $L_1$ will drop to zero at $t_7$. The diode $D_0$ will stay conductive thereafter thanks to energy liberation by the transformer 5. The $t_7$–$t_8$ period is a repetition of the pre-$t_1$ period in FIG. 4. One cycle of operation comes to an end at $t_8$. Another similar cycle will restart at $t_8$ when the ancillary switch $Q_2$ is turned on again.

The advantages gained by this particular embodiment of the invention may be recapitulated as follows:

1. The primary switch $Q_1$ is turned both on and off at zero voltage, assuring less switching loss and higher efficiency.
2. The ancillary switch $Q_2$ is turned on at zero current and off at zero voltage and zero current, resulting in less switching loss due to this ancillary switch.
3. The current $I_{L1}$ through the inductor $L_1$ changes in peak value with the amplitude of the a.c. input voltage $V_{ac}$, with consequent improvements in a.c. input power factor and waveform. Such improvements in power factor and waveform are accomplished with the aid of the primary switch $Q_1$ in the d.c.-to-d.c. converter circuit comprising the smoothing capacitor $C_1$, transformer 5, primary switch $Q_1$, and rectifying and smoothing circuit 6. The objectives of improved power factor, improved waveform, and output voltage control are realized with the simple circuitry.
4. The ancillary circuit 7 for the soft switching of the primary switch $Q_1$ makes use of the winding $N_3$ which is incorporated with the transformer 5 as its tertiary, thereby avoiding too much increase in the size and cost of the power supply.
5. By reason of the connection of the inductor $L_1$ to the tap 10 on the transformer primary $N_1$, the current $I_{L1}$ does not flow through this first inductor even if the primary switch is closed, unless the potential on the first rectifier output conductor 43 grows higher than that at the tap 10. The first inductor current $I_{L1}$ does not flow for this reason during the $t_0$–$t_1$, $t_6$–$t_8$, and $t_9$–$t_{10}$ periods in FIG. 5. Although this may seem disadvantageous from the standpoints of waveform and power factor improvements, it should also be taken into account that power loss does not occur at the first inductor $L_1$ as long as there is no current flow therethrough. Higher efficiency may therefore be attained without sacrifice in waveform and power factor through adjustment of the tap position on the transformer primary $N_1$.

Figure 6:
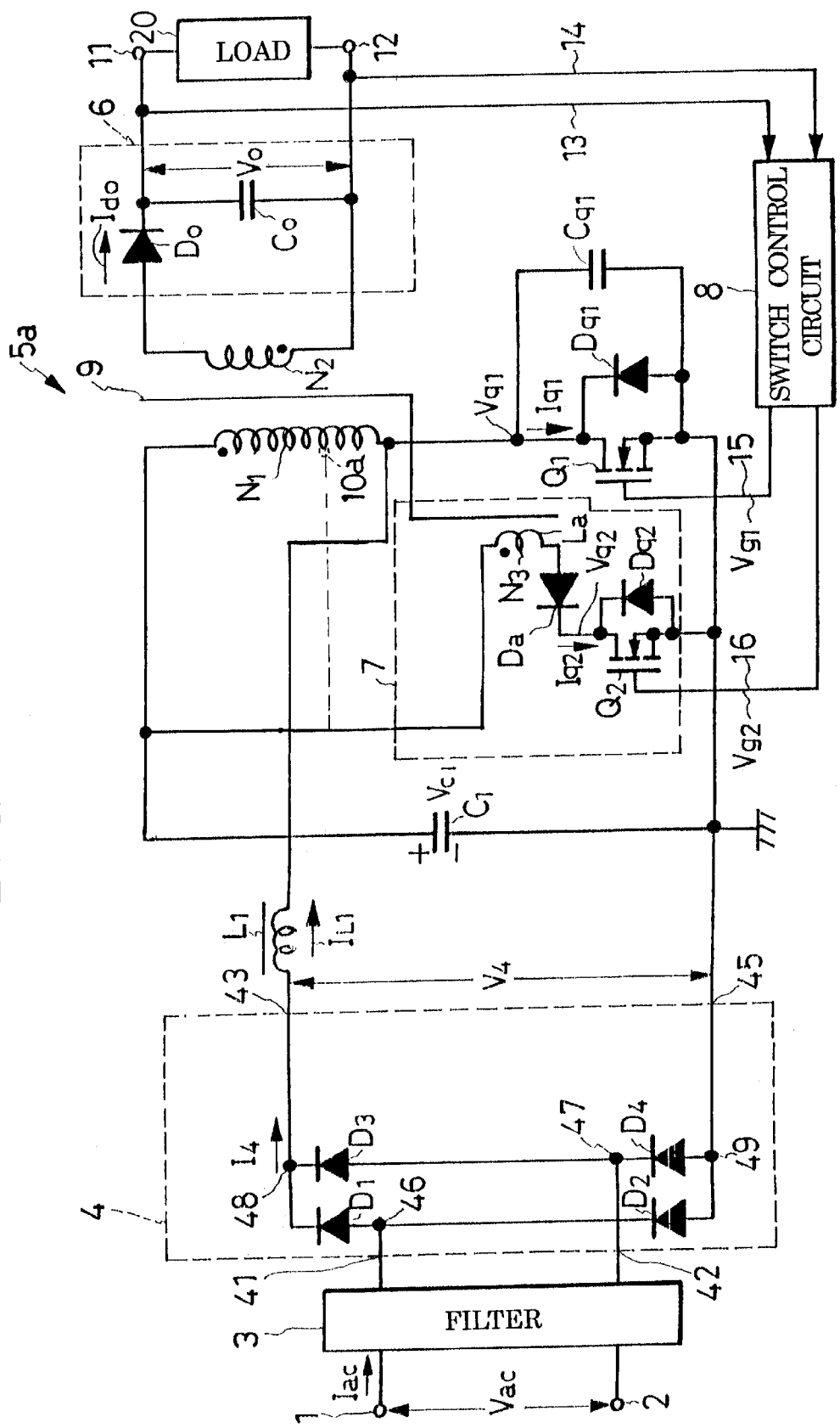
FIG. 6 is a view similar to FIG. 1 but showing a second preferred form of switching power supply according to the invention.

Embodiment of FIG. 6

This alternative form of switching power supply features a modified transformer $5_a$ having an untapped primary $N_1$. The primary inductor $L_1$ is connected to the junction between transformer primary $N_1$ and primary switch $Q_1$, instead of to the tap 10 as in FIG. 1. The primary inductor $L_1$ is therefore coupled to the smoothing capacitor $C_1$ via the whole of the transformer primary $N_1$ and directly to the primary switch $Q_1$. All the other details of construction are as set forth above with reference to FIGS. 1 and 2.

Upon conduction of the primary switch $Q_1$ the current $I_{L1}$ will flow through the path comprising the first rectifier output conductor 43, primary inductor $L_1$, primary switch $Q_1$ and second rectifier output conductor 45 even when the a.c. input voltage $V_{ac}$ is low in amplitude, as from $t_0$ to $t_1$, $t_6$ to $t_8$, and $t_9$ to $t_{10}$ in FIG. 5. For this reason the FIG. 6 power supply is preferable to its FIG. 1 counterpart from the viewpoints of improvements in input waveform and power factor. Offsetting these advantages is higher power loss as a result of the flow of the current $I_{L1}$ through the primary inductor $L_1$ practically throughout the complete cycle of the a.c. input voltage $V_{ac}$. A compromise may be made by employing the FIG. 1 device where efficiency matters, and that of FIG. 6 where better input waveform and higher power factor are more important. A reduction of switching loss represents a feature common to both embodiments as they both incorporate the soft-switching circuit 7.

Figure 7:
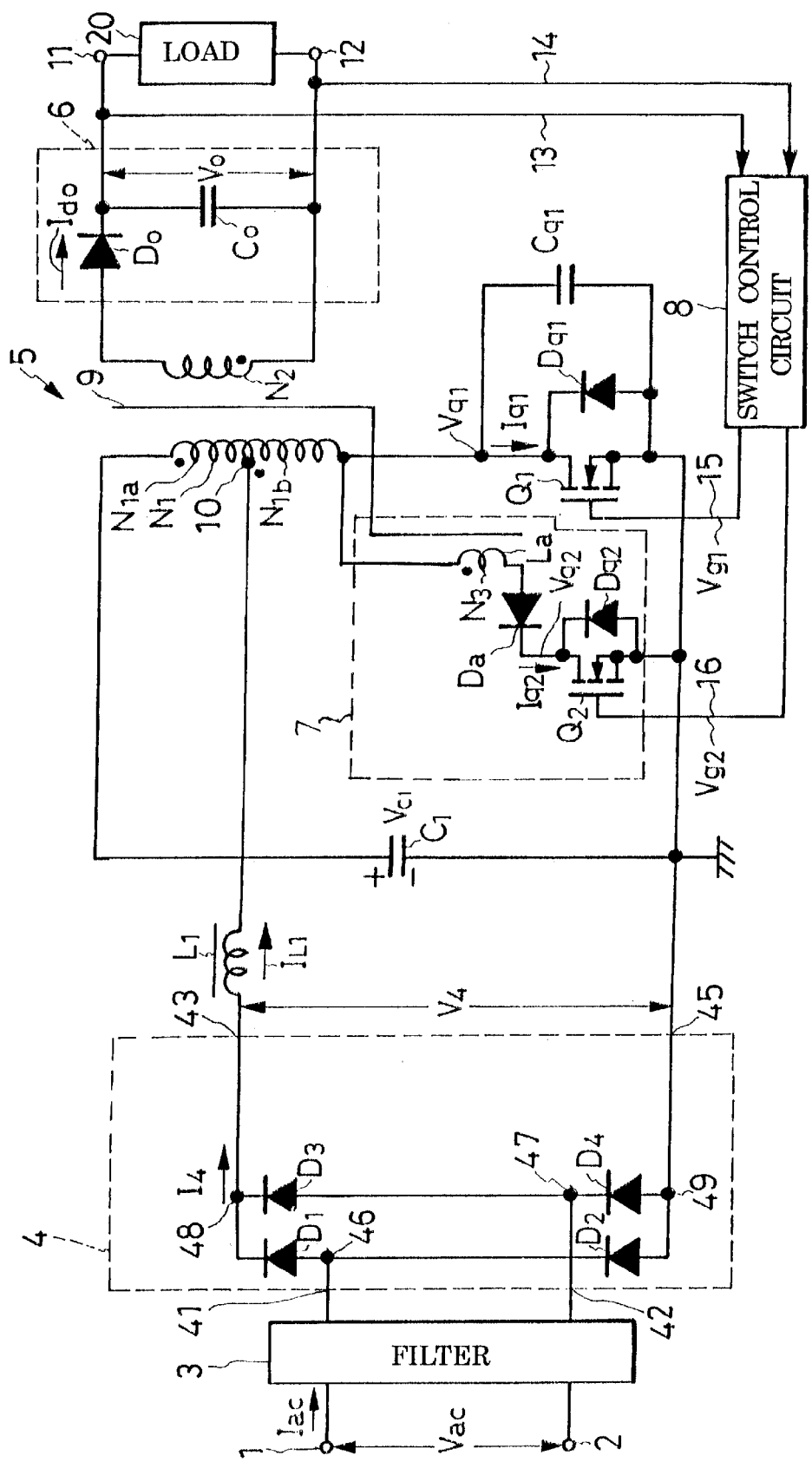
FIG. 7 is also a view similar to FIG. 1 but showing a third preferred form of switching power supply according to the invention.

Embodiment of FIG. 7

Another preferred form of switching power supply shown here differs from the FIG. 1 device only in the connections of the soft-switching circuit 7. Similar in construction to its FIG. 1 counterpart, the soft-switching circuit 7 includes the serial connection of the transformer tertiary $N_3$, ancillary diode $D_a$, and ancillary switch $Q_2$. This serial circuit is directly connected in parallel with the primary switch $Q_1$, "directly" because the transformer primary $N_1$ is not inserted in the parallel connection as in FIG. 1. The serial circuit above is connected, instead, in parallel with the smoothing capacitor $C_1$ via the transformer primary $N_1$.

The operation of the FIG. 7 embodiment exclusive of the soft-switching circuit 7 is similar to that of the FIG. 1 embodiment exclusive of its soft-switching circuit 7. The operation of the FIG. 7 soft-switching circuit 7 is essentially similar to that of FIG. 1. The operation of the FIG. 7 device is therefore explainable in reference to the waveform diagram of FIG. 4.

The ancillary switch current $I_{q2}$ will start flowing along the path comprising the smoothing capacitor $C_1$, transformer primary $N_1$, transformer tertiary $N_3$, ancillary diode $D_a$, and ancillary switch $Q_2$ at $t_1$ in FIG. 4 when the ancillary switch $Q_2$ is turned on. The current flow through the transformer tertiary $N_3$ will cause the transformer secondary $N_2$ to develop a voltage that is oriented to reverse-bias the diode $D_0$, causing nonconduction therethrough as at (H) in FIG. 4. The transformer primary $N_1$ will be released from clamping by the voltage $V_0$ across the capacitor $C_0$ via the transformer secondary $N_2$. The soft switching capacitor $C_{q1}$ will start discharging along the path comprising the transformer tertiary $N_3$, ancillary diode $D_a$, and ancillary switch $Q_1$. Consequently, as indicated at (C) in FIG. 4, the voltage $V_{q1}$ across the primary switch $Q_1$ will start diminishing at $t_1$ and drop to zero at $t_2$. The zero-voltage switching of the primary switch $Q_1$ will thus be accomplished by turning the same on at $t_2$ or any moment from $t_2$ to $t_3$. Since the transformer tertiary $N_3$ has inductance $L_a$, the current $I_{q2}$ flowing through the ancillary switch $Q_2$ during the $t_1$–$t_2$ period will rise with a gradient as at (F) in FIG. 4.

At $t_2$, when the soft switching capacitor $C_{q1}$ completes its discharge and when the primary switch $Q_1$ is turned on as at (A) in FIG. 4, the transformer tertiary $N_3$ will start liberating the energy that has been stored during the $t_1$–$t_2$ period. The current will flow both along the path comprising the ancillary diode $D_a$, ancillary switch $Q_2$ and primary switch protection diode $D_{q1}$, and along the path comprising the ancillary diode $D_a$, ancillary switch $Q_2$, smoothing capacitor $C_1$ and transformer primary $N_1$. The ancillary switch current $I_{q2}$ will start diminishing at $t_2$ and drop to zero at $t_4$, as at (F) in FIG. 4. A zero-voltage turnoff of the ancillary switch $Q_2$ is therefore possible from $t_4$ to $t_5$.

The primary switch $Q_1$ is shown turned off at zero voltage at $t_5$. As has been set forth in connection with the FIG. 1 embodiment, the soft switching capacitor $C_{q1}$ has then been charged.

The soft-switching circuit 7 and primary inductor $L_1$ of the FIG. 7 switching power supply function just like their counterparts of the FIG. 1 device. The FIG. 7 embodiment gains the same advantages as that of FIG. 1.

Figure 8:
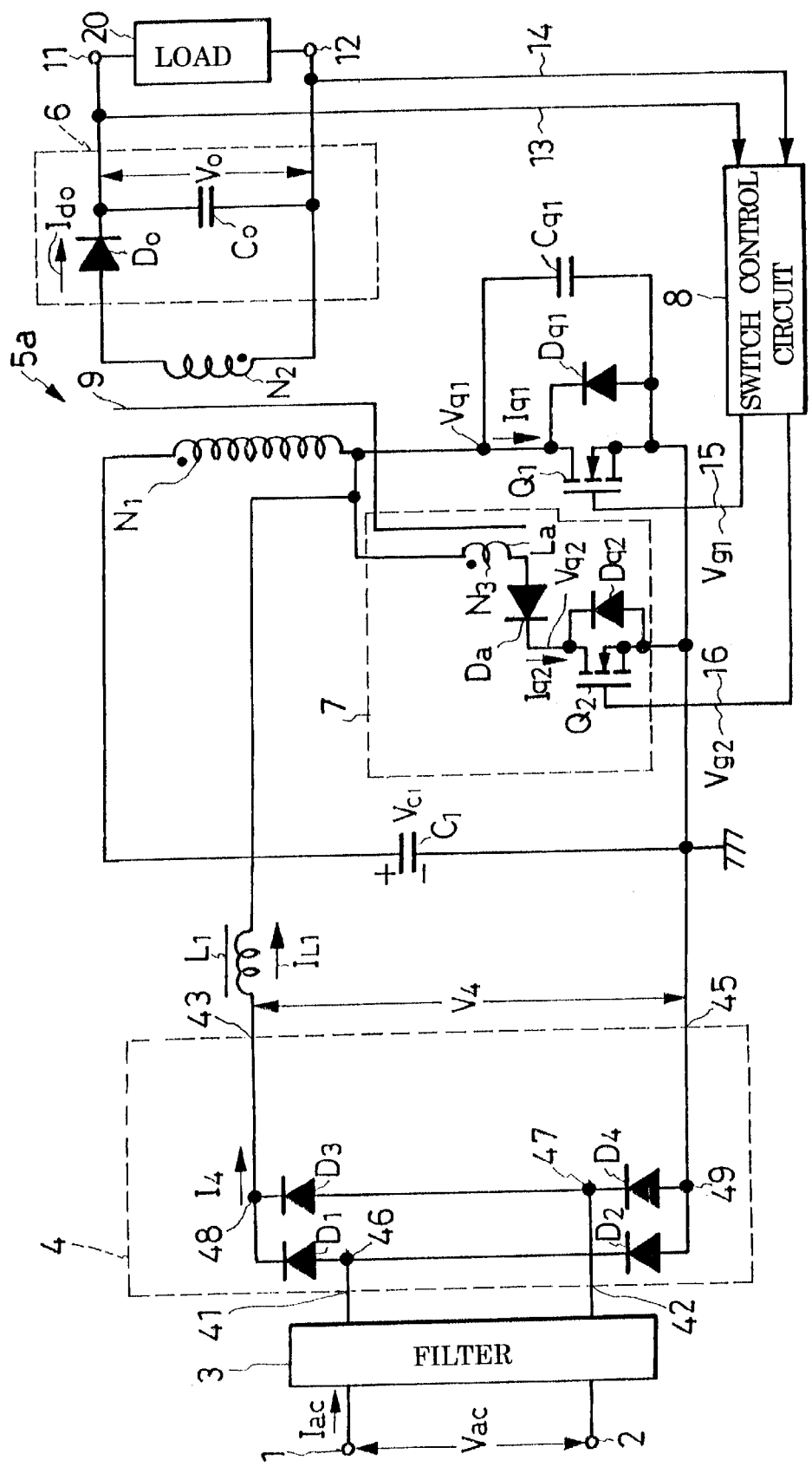
FIG. 8 is also a view similar to FIG. 1 but showing a fourth preferred form of switching power supply according to the invention.

Embodiment of FIG. 8

The FIG. 8 embodiment is similar to that of FIG. 7 except that the primary inductor $L_1$ is connected to the junction between transformer primary $N_1$ and primary switch $Q_1$ as in FIG. 6. The transformer primary $N_1$ is therefore untapped. The operation of the FIG. 8 power supply exclusive of the soft-switching circuit 7 is analogous with that of the FIG. 6 counterpart. The soft-switching circuit 7 is of the same construction and connections as that of FIG. 7, so that the zero-voltage switching of the primary switch $Q_1$ is possible as in FIG. 7.

Figure 9:
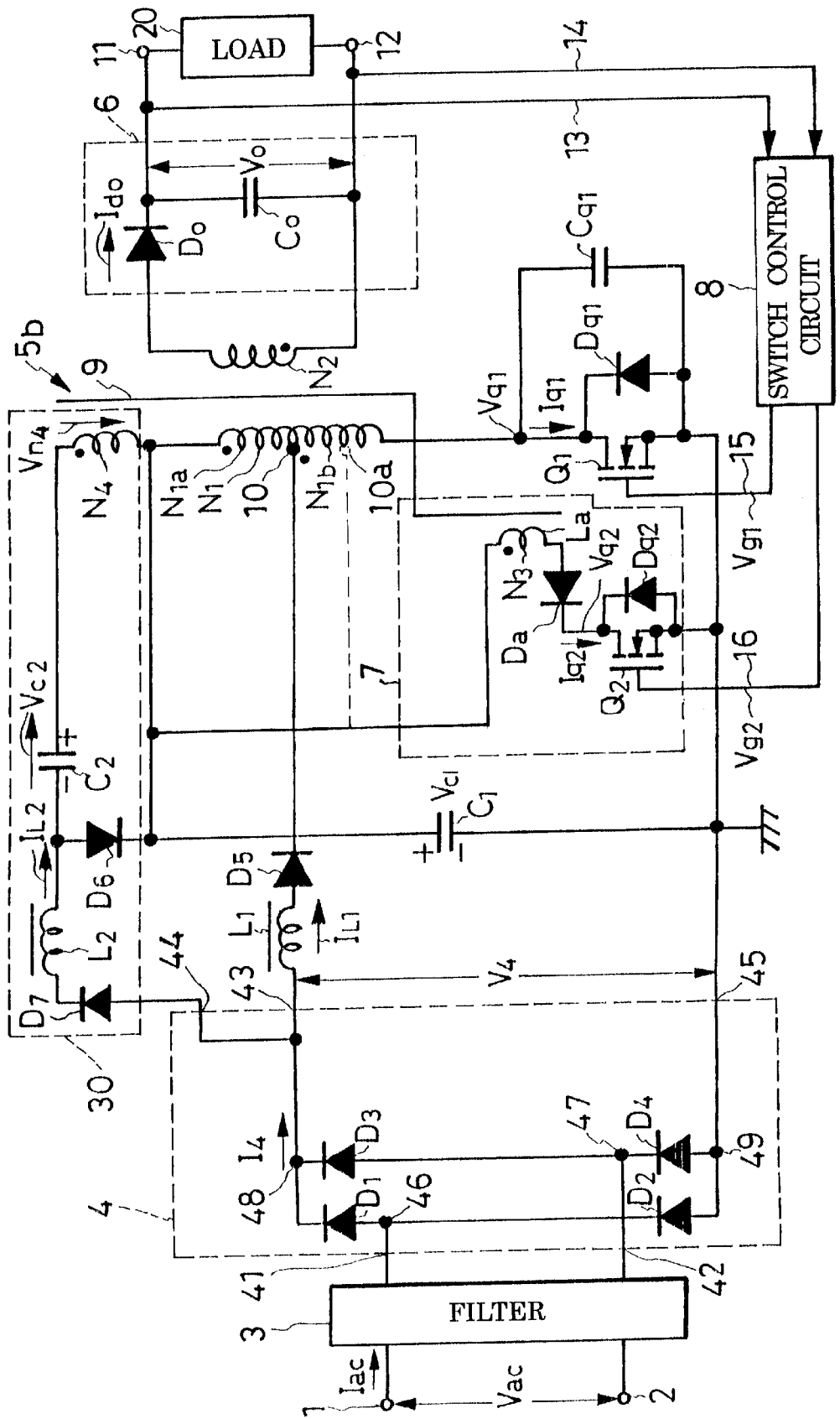
FIG. 9 is also a view similar to FIG. 1 but showing a fifth preferred form of switching power supply according to the invention.

Embodiment of FIG. 9

The FIG. 9 embodiment represents an addition of an ancillary charging circuit 30 and reverse-blocking diode $D_5$ to the FIG. 1 embodiment, all the other details of construction being as previously set forth in conjunction with FIGS. 1 and 2. The ancillary charging circuit 30 comprises a transformer quaternary $N_4$, a capacitor $C_2$, two diodes $D_6$ and $D_7$, and an inductor $L_2$. Connected between an additional output conductor 44 of the rectifier circuit 4 and the smoothing capacitor $C_1$, the ancillary charging circuit 30 provides a voltage for addition to the rectifier output voltage $V_4$ between the additional rectifier output conductor 44 and the grounded rectifier output conductor 45. The reverse-blocking diode $D_5$ is connected in series with the primary inductor $L_1$.

The transformer quaternary $N_4$ of the ancillary charging circuit 30 has one of its opposite extremities connected to both transformer primary $N_1$ and smoothing capacitor $C_1$. The other extremity of the transformer quaternary $N_4$ is connected to the additional rectifier output conductor 44 via a serial connection of the ancillary charging capacitor $C_2$, ancillary charging inductor $L_2$, and second ancillary charging diode $D_7$. The first ancillary charging diode $D_6$ is connected in parallel with the transformer quaternary $N_4$ via the ancillary charging capacitor $C_2$. The ancillary charging capacitor $C_2$ is connected between ancillary charging inductor $L_2$ and transformer quaternary $N_4$. The first ancillary charging diode $D_6$ has its anode connected to the junction between ancillary charging capacitor $C_2$ and ancillary charging inductor $L_2$. The additional rectifier output conductor 44, to which is connected the ancillary charging circuit 30 as above, is connected to the junction 48 between the diodes $D_1$ and $D_3$ of the rectifier circuit 4.

The transformer of the FIG. 9 device is generally designated $5_b$. The transformer $5_b$ is similar in construction to the FIG. 1 transformer 5 except for the addition of the quaternary $N_4$, which of course is electro-magnetically coupled to the other windings of the transformer.

The operation of the FIG. 9 device except the ancillary charging circuit 30 is akin to that of FIG. 1. The smoothing capacitor $C_1$ will be charged to the desired d.c. voltage $V_{c1}$ as the primary switch $Q_1$ is turned on and off by the switch control circuit 8. The ancillary charging capacitor $C_2$ will be charged to a voltage $V_{c2}$ by the voltage across the transformer quaternary $N_4$. The resulting steady-state operation of this switching power supply, particularly of its ancillary charging circuit 30, will be discussed hereinbelow with reference to FIGS. 10 and 11 which show the voltage and current waveforms appearing in various parts of the FIG. 9 circuitry.

Figure 10:
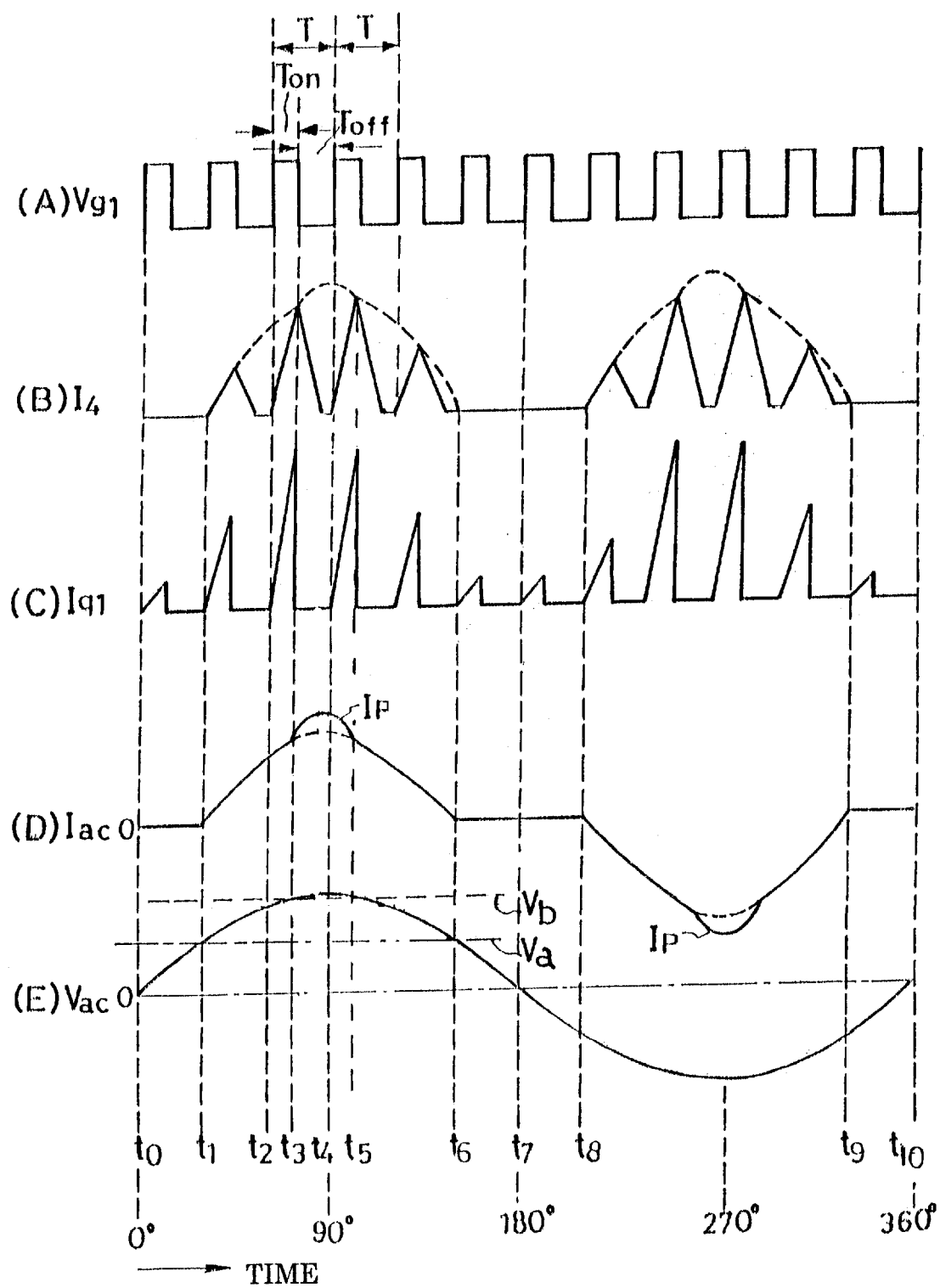
FIG. 10, consisting of (A) through (E), is a series of diagrams showing the voltage and current waveforms appearing in various parts of the FIG. 9 device.

FIG. 10 is similar to FIG. 5, being illustrative of how the invention achieves improvements in power factor and input waveform by the FIG. 9 embodiment. At (A) in this waveform diagram are shown the series of switch control pulses $V_{g1}$ applied by the switch control circuit 8 to the primary switch $Q_1$. The primary switch $Q_1$ will be turned on and off during each cycle T of the switch control signal consisting of one pulse, as from $t_2$ to $t_3$, and one space between such pulses, as from $t_3$ to $t_4$. The repetition rate of the switch control signal $V_{g1}$ is assumed to be 20 kHz. At (E) in FIG. 10 is shown the 50 Hz sinusoidal a.c. voltage $V_{ac}$ being applied between the pair of a.c. input terminals 1 and 2.

As the primary switch $Q_1$ is repeatedly turned on and off by the switch control pulses $V_{g1}$, the amplitudes or peak values of the output current $I_4$ of the rectifier circuit 4 and the current $I_{q1}$ through the primary switch $Q_1$ will change, as at (B) and (C) in FIG. 10, in conformity with the amplitude of the a.c. input voltage $V_{ac}$. Thus the a.c. input current $I_{ac}$ shown at (D) in FIG. 10 will closely approximate a sinusoidal wave, with consequent improvement in power factor and input waveform. The rectifier output current 14 is shown at (B) in FIG. 10 as the current flowing through the junction 48 between the diodes $D_1$ and $D_3$ and is the sum of the current $I_{L1}$ through the primary inductor $L_1$ and the current $I_{L2}$ through the ancillary charging inductor $L_2$.

It is to be noted that the primary inductor $L_1$ is connected to the tap 10 of the transformer primary $N_1$ via the reverse-blocking diode $D_5$ in this FIG. 9 embodiment. As a result, there will be no flow of the primary inductor current $I_{L1}$ or of the a.c. input current $I_{ac}$ when the rectifier output voltage $V_4$ is less than the tap voltage due to the voltage $V_{c1}$ across the smoothing capacitor $C_1$, as from $t_0$ to $t_1$, from $t_6$ to $t_8$, and from $t_9$ to $t_{10}$. The rectifier output current $I_4$ and a.c. input current $I_{ac}$ are both shown to flow from $t_1$ to $t_6$ and from $t_8$ to $t_9$ at (B) and (D) in FIG. 10.

The FIG. 9 power supply operates in three different modes depending upon the instantaneous value of the a.c. supply voltage $V_{ac}$ shown at (E) in FIG. 10. Let $V_a$ be a first voltage value that is equal to the voltage between the tap 10 on the transformer primary $N_1$ and the grounded conductor 45 during the conducting periods of the primary switch $Q_1$, and $V_b$ be a second voltage value that is equal to the voltage $V_{c1}$ across the smoothing capacitor $C_1$. Then, in the first 180 degrees of the a.c. supply voltage $V_{ac}$, the power supply will operate in First Mode during the $t_0$–$t_1$ and $t_6$–$t_7$ periods when the a.c. supply voltage $V_{ac}$ is between 0 and first value $V_a$, in Second Mode during the $t_1$–$t_3$ and $t_5$–$t_6$ periods when the voltage $V_{ac}$ is between first value $V_a$ and second value $V_b$, and in Third Mode during the $t_3$–$t_5$ period when the voltage $V_{ac}$ is higher than the second value $V_b$.

Incidentally, each negative half-cycle of the a.c. supply voltage $V_{ac}$, as from $t_7$ to $t_{10}$ in FIG. 10, is inverted into the same shape as that of each positive half-cycle, as from $t_0$ to $t_7$, as the a.c. supply voltage is rectified by the rectifier circuit 4. The noted three modes of operation repeat themselves during the negative half-cycles. Also, in FIG. 10, the a.c. supply voltage $V_{ac}$ is shown to cross the second value level $V_b$ at the termination of one conducting period $T_{on}$ of the primary switch $Q_1$. This showing is by way of example only; in practice, the crossing moment may come at other than the end of each conducting period.

In First Mode of operation, as from $t_0$ to $t_1$ and from $t_6$ to $t_7$ in FIG. 10, the primary switch current $I_{q1}$ will flow as at (C) in FIG. 10 along the path comprising the smoothing capacitor $C_1$, transformer primary $N_1$, and primary switch $Q_1$ each time this switch conducts. No energy release from the transformer 5 will occur on its output side during these periods because then the diode $D_0$ is nonive. Energy will therefore be stored on the transformer $5_b$. The potential at the tap 10 on the transformer primary $N_1$ is now higher than that of the first rectifier output conductor 43, so that there will be no flow of current $I_{L1}$ through the primary inductor $L_1$. There will be no flow of current $I_{L2}$ through the ancillary inductor $L_2$, either, because the voltage $V_{C1}$ across the smoothing capacitor $C_1$ is now higher than the rectifier output voltage $V_4$.

The energy that has been stored as above on the transformer $5_b$ will be released when the switch $Q_1$ subsequently goes off, with the consequent current flow along the path comprising the transformer secondary $N_2$, diode $D_0$, and capacitor $C_0$. The load 10 will therefore be powered even though the a.c. supply voltage $V_{ac}$ is now lower than from $t_1$ to $t_6$.

In Second Mode, as from $t_1$ to $t_3$ and from $t_5$ to $t_6$ in FIG. 10, the potential at the transformer primary tap 10 will be less than that of the first rectifier output conductor 43. There will therefore be a flow of current $I_{L1}$ through the primary inductor $L_1$. When the primary switch $Q_1$ goes on, the current $I_{L1}$ will flow along the path comprising the first rectifier output conductor 43, primary inductor $L_1$, reverse-blocking diode $D_5$, transformer primary second part $N_{1b}$, primary switch $Q_1$, and ground-potential conductor 45. Current will also flow along the path comprising the smoothing capacitor $C_1$, transformer primary $N_1$, and primary switch $Q_1$. Thus the current $I_{q1}$ now flowing through the primary switch $Q_1$, shown at (C) in FIG. 10, will be the sum of the currents flowing through the two paths just mentioned. The diode $D_7$ of the ancillary charging circuit 30 will be off in Second Mode because the smoothing capacitor voltage $V_{c1}$ will be higher than the rectifier output voltage $V_4$.

When the primary switch $Q_1$ is off, as from $t_3$ to $t_4$ in FIG. 10, in Second Mode, on the other hand, the current $I_{L1}$ will flow to charge the smoothing capacitor $C_1$, with energy release from the primary inductor $L_1$. There will also be a current flow through the diode $D_0$ of the rectifying and smoothing circuit 6 as a result of energy release from the transformer $5_b$ and primary inductor $L_1$. The primary inductor current $I_{L1}$ will decrease in magnitude with the progress of the energy release from the transformer $5_b$ and primary inductor $L_1$.

In Third Mode, as from $t_3$ to $t_5$ in FIG. 10, the a.c. input voltage $V_{ac}$ and the rectifier output voltage $V_4$ will be higher than the smoothing capacitor voltage $V_{c1}$, so that both first and second ancillary charging diodes $D_6$ and $D_7$ will be conductive. Both primary inductor current $I_{L1}$ and ancillary inductor current $I_{L2}$ will then flow, as will be hereinafter explained in more detail with reference to FIG. 11.

Figure 11:
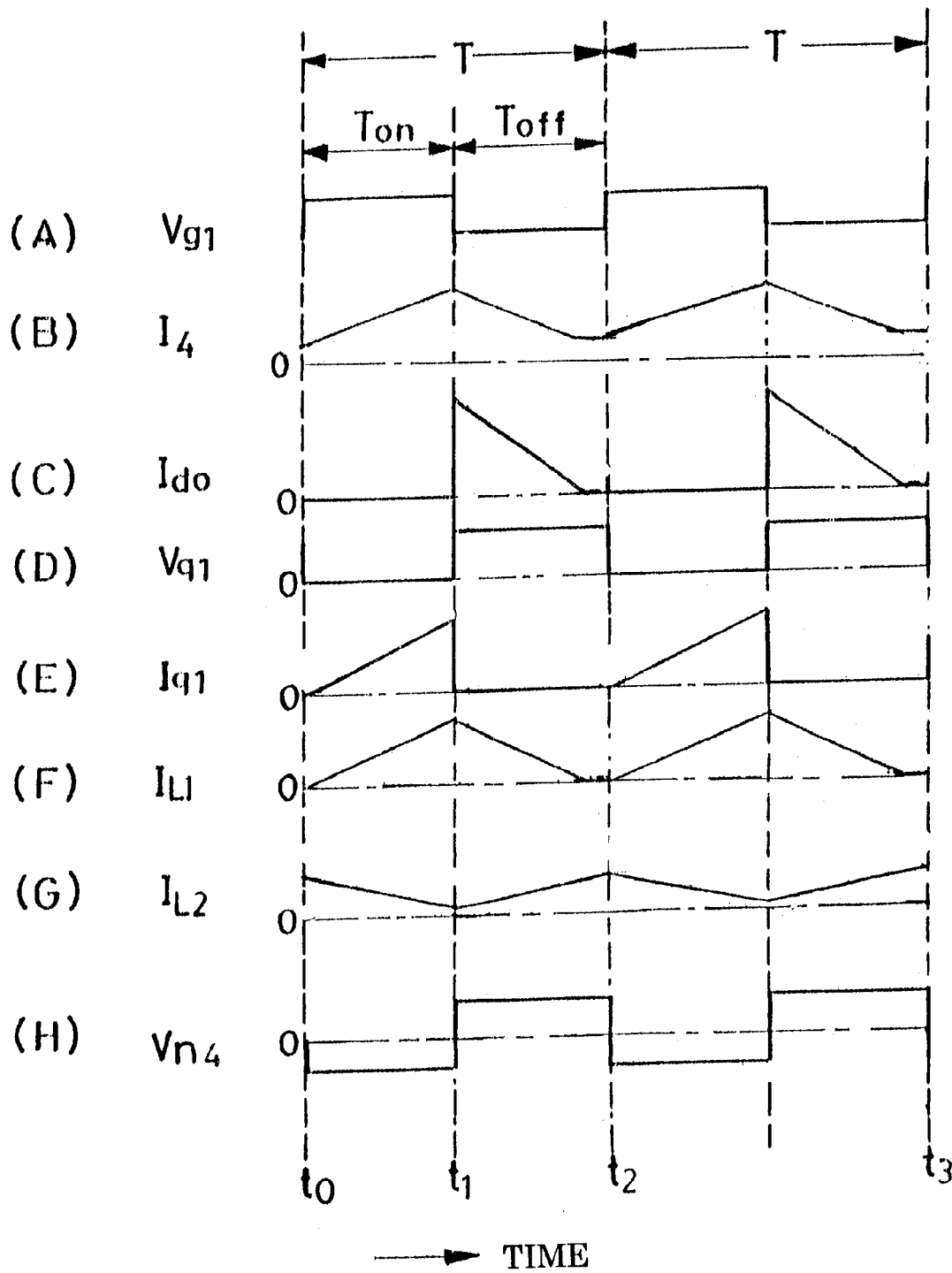
FIG. 11, consisting of (A) through (H), is a series of diagrams showing the voltage and current waveforms appearing in various parts of the FIG. 9 device on a different time scale.

When the primary switch $Q_1$ is on, as from $t_0$ to $t_1$ in FIG. 11, in response to one of the primary switch control pulses shown at (A) in this figure, the primary inductor current $I_{L1}$ will flow as at (F) in FIG. 11 along the same path as in Second Mode. There will also be a current flow in the circuit comprising the smoothing capacitor $C_1$, transformer primary $N_1$, and primary switch $Q_1$. The primary switch current $I_{q1}$, (E) in FIG. 11, is the sum of the primary inductor current $IL_1$, (F) in FIG. 11, and the current discharged by the smoothing capacitor $C_1$. Also, during the conducting period Ton of the primary switch $Q_1$, there will be obtained across the transformer quaternary $N_4$ a voltage $V_{n4}$, (H) in FIG. 11, depending upon the ratio of the turns of the transformer primary $N_1$ and ancillary $N_4$. This voltage $V_{n4}$ is oriented to forwardly bias the first ancillary charging diode $D_6$, so that current will flow in the closed circuit comprising the transformer quaternary $N_4$, ancillary charging capacitor $C_2$, and first ancillary charging diode $D_6$. The ancillary charging capacitor $C_2$ will be charged with the polarity indicated in FIG. 9, with the consequent development of a voltage $V_{C2}$ across the same.

As will be noted from (G) in FIG. 11, there has been a sustained flow of current $I_{L2}$ through the ancillary inductor $L_2$ during the nonconducting period of the primary switch $Q_1$ preceding the $t_0$–$t_1$ conducting period $T_{on}$ of FIG. 11. This ancillary inductor current $I_{L2}$ will gradually decrease in magnitude during the $t_0$–$t_1$ period because then the anode potential of the first ancillary charging diode $D_6$ will be higher than that during each nonconducting period $T_{off}$ of the primary switch $Q_1$. The ancillary inductor current $I_{L2}$ will flow during this conducting period $T_{on}$ along the path comprising the first a.c. input terminal 1, filter 3, first rectifier diode $D_1$, second ancillary charging diode $D_7$, ancillary charging inductor $L_2$, first ancillary charging diode $D_6$, smoothing capacitor $C_1$, fourth rectifier diode $D_4$, filter 3, and second a.c. input terminal 2. The ancillary inductor current $I_{L2}$ will increase in magnitude with the a.c. input voltage $V_{ac}$.

Then, during the ensuing nonconducting period $T_{off}$ of the primary switch $Q_1$, as from $t_1$ to $t_2$ in FIG. 11, the smoothing capacitor $C_1$ will be charged by the primary inductor current $I_{L1}$ as in Second Mode, and the current $I_{do}$ will flow through the diode $D_0$ of the rectifying and smoothing circuit 6 as at (C) in FIG. 11. Further, as the transformer secondary $N_2$ will be clamped by the voltage $V_0$ across the capacitor $C_0$, a voltage $V_{N4}$ will develop across the transformer quaternary $N_4$ as at (H) in FIG. 11. The transformer quaternary voltage $V_{N4}$ during the nonconducting period $T_{off}$ will be opposite in polarity to that during the conducting period $T_{on}$, reverse-biasing the first ancillary charging diode $D_6$. Since this transformer quaternary voltage $V_{N4}$ during the nonconducting period $T_{off}$ will be opposite in polarity to the smoothing capacitor voltage $V_{C1}$, the potential at the right-hand extremity, as viewed in FIG. 9, of the ancillary charging inductor $L_2$ will be less than that during the conducting period.

The ancillary charging inductor current $I_{L2}$ will rise gradually in magnitude during the nonconducting period $T_{off}$. The ancillary charging inductor current $I_{L2}$ will flow along the path comprising the first a.c. input terminal 1, filter 3, first rectifier diode $D_1$, second ancillary charging diode $D_7$, ancillary charging inductor $L_2$, ancillary charging capacitor $C_2$, transformer quaternary $N_4$, smoothing capacitor $C_1$, fourth rectifier diode $D_4$, filter 3, and second a.c. input terminal 2, charging the smoothing capacitor $C_1$ in so doing. The smoothing capacitor $C_1$ is charged by both primary inductor current $I_{L1}$ and ancillary inductor current $I_{L2}$. It will therefore be appreciated that the smoothing capacitor $C_1$ is charged to the voltage $V_{C1}$ that is higher than if, as has been the case heretofore, it is charged only by the primary inductor current $I_{L1}$. The current $I_4$ through the rectifier circuit 4, shown at (B) in FIG. 11, is the sum of the primary and ancillary inductor currents $I_{L1}$ and $I_{L2}$, (F) and (G) in FIG. 11.

Incidentally, FIG. 11 is meant purely to illustrate how the current and voltage signals in question change with time. Their amplitudes are shown simplified or idealized.

The FIG. 9 embodiment possesses the advantages as that of FIG. 1 resulting from the primary inductor $L_1$ and soft-switching circuit 7. The ancillary charging circuit 30 offers the following additional advantages.

1. The smoothing capacitor $C_1$ is charged not only by the primary charging network comprising the rectifier circuit 4, primary inductor $L_1$, reverse-blocking diode $D_5$, and transformer primary first part $N_{1a}$, but by the ancillary charging circuit 30 as well. If the smoothing capacitor is to be charged in the FIG. 1 circuitry to the same voltage as heretofore, the current $I_{L1}$ flowing through the primary inductor $L_1$ can be of smaller magnitude than in the prior art charging circuit. Not only can the primary inductor $L_1$ be reduced in size, but also power loss is lessened here for higher overall efficiency of the power supply. The primary inductor current $I_{L1}$ may be reduced, of course, only to such a level that the desired improvements in input current waveform and power factor does not become unattainable. The ancillary charging circuit 30 has its own power loss. Yet the current flowing through this circuit for charging the smoothing capacitor $C_1$ is only of such magnitude that the resulting power loss is negligible. Altogether, the FIG. 9 switching power supply possesses a decisive advantage over the prior art in terms of efficiency in operation and compactness in size.

2. If the current flowing through the primary inductor $L_1$ for charging the smoothing capacitor $C_1$ is of the same magnitude as heretofore, on the other hand, then the smoothing capacitor will be charged to the voltage $V_{C1}$ that is higher than heretofore by the amount charged by the ancillary charging circuit 30. Such higher smoothing capacitor voltage $V_{C1}$ will be effective to restrict the peaks of the current flowing into the smoothing capacitor $C_1$ at or adjacent the peaks of the rectifier output voltage $V_4$, resulting in the reduction of the higher harmonics of the a.c. input current $I_{ac}$.

3. The second ancillary charging diode $D_7$ functions to block reverse current flow from ancillary charging circuit 30 toward primary inductor $L_1$. The primary inductor current $I_{L1}$ is reduced in magnitude in this respect, too, for further curtailment of power loss.

Figure 12:
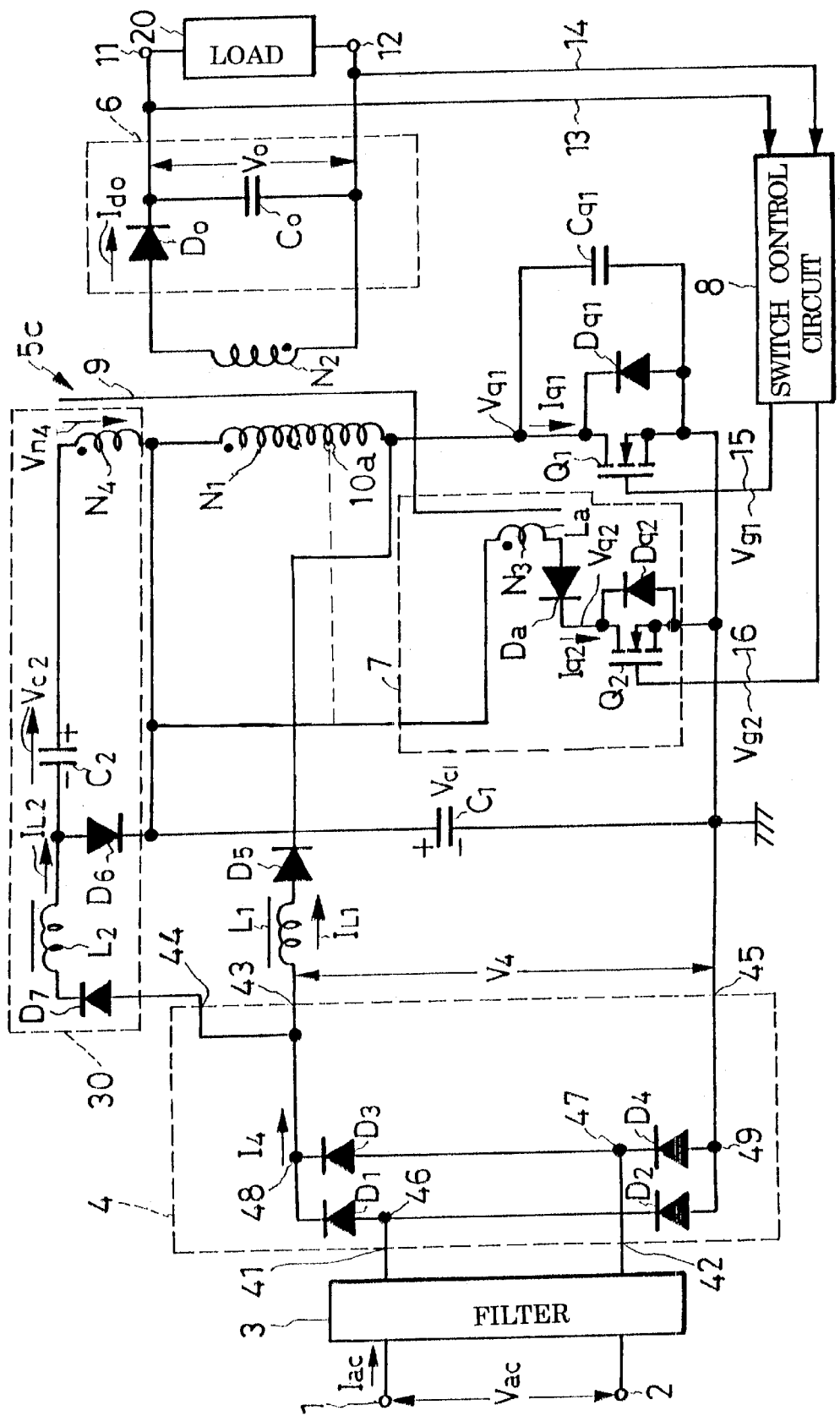
FIG. 12 is a view similar to FIG. 1 but showing a sixth preferred form of switching power supply according to the invention.

Embodiment of FIG. 12

The FIG. 12 power supply is similar to that of FIG. 9 except for the connection of the primary inductor $L_1$ to the transformer primary $N_1$. The primary inductor $L_1$ is connected via the reverse-blocking diode $D_5$ to the junction between transformer primary $N_1$ and primary switch $Q_1$, instead of to the tap 10 as in FIG. 9. The transformer 5, shown in FIG. 12 is equivalent to the FIG. 9 transformer $5_b$ minus the tap 10. The relationship between primary inductor $L_1$ and transformer primary $N_1$ in FIG. 12 is akin to that in FIG. 6, so that the FIG. 12 embodiment combines the advantages of the FIGS. 6 and 9 embodiments.

Figure 13:
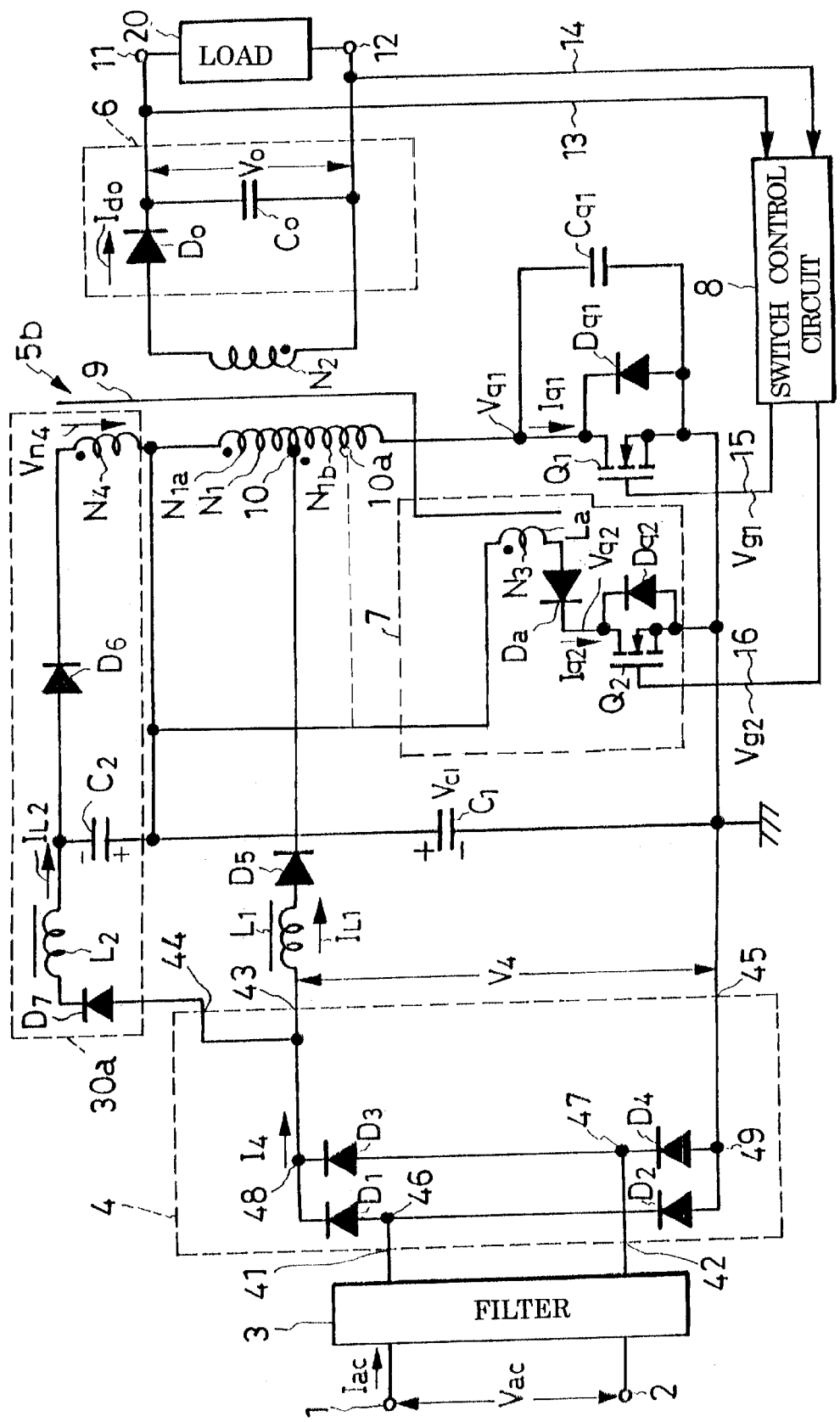
FIG. 13 is also a view similar to FIG. 1 but showing a seventh preferred form of switching power supply according to the invention.

Embodiment of FIG. 13

This switching power supply employs a modified ancillary charging circuit $30_a$ in place of its FIG. 9 counterpart 30 but is identical with the FIG. 9 embodiment in all the other details of construction. The alternate ancillary charging circuit $30_a$ has the first ancillary charging diode $D_6$ connected between ancillary charging inductor $L_2$ and transformer quaternary $N_3$, and the ancillary charging capacitor $C_2$ connected between ancillary charging inductor $L_2$ and smoothing capacitor $C_1$. All the other details of construction are as previously set forth in connection with the FIG. 9 ancillary charging circuit 30.

The voltage that builds up across the transformer quaternary $N_4$ during the conducting periods of the primary switch $Q_1$ is oriented to reversely bias the first ancillary charging diode $D_6$. There will therefore be no current flow through this diode $D_6$ that would charge the ancillary charging capacitor $C_2$. A voltage capable of forwardly biasing the first ancillary charging diode $D_6$ will develop across the transformer quaternary $N_4$ during the nonconducting periods of the primary switch $Q_1$, so that a closed circuit of the transformer quaternary $N_4$, ancillary charging capacitor $C_2$, and first ancillary charging diode $D_6$ will be completed for the flow of current ancillary charging the ancillary charging capacitor $C_2$.

If the voltage drop across the second ancillary charging diode $D_7$ is disregarded, the voltage between the input-side terminal of the ancillary charging inductor $L_2$ and the ground-potential conductor 45 is equal to the rectifier output voltage $V_4$. The voltage between the output-side terminal of the ancillary charging inductor $L_2$ and the ground-potential conductor 45 is equal to the difference between the voltage $V_{c1}$ across the smoothing capacitor $C_1$ and the voltage $V_{c2}$ across the ancillary charging capacitor $C_2$. Thus the voltage $V_{L2}$ across the ancillary charging inductor $L_2$ is defined as:

$$V_{L2}=V_4-(V_{c1}-V_{c2})=V_4-V_{c1}+V_{c2}.$$

It is thus seen that the ancillary charging inductor current $I_{L2}$ flows only when the sum of $V_4$ and $V_{c2}$ is greater than $V_{c1}$. As in the FIG. 9 embodiment, the smoothing capacitor $C_1$ is charged both by the current $I_{L1}$ through the primary inductor $L_1$ and by the current $I_{L2}$ through the ancillary inductor $L_2$, to the voltage $V_{c1}$ that is higher than that of the FIG. 1 embodiment.

Figure 14:
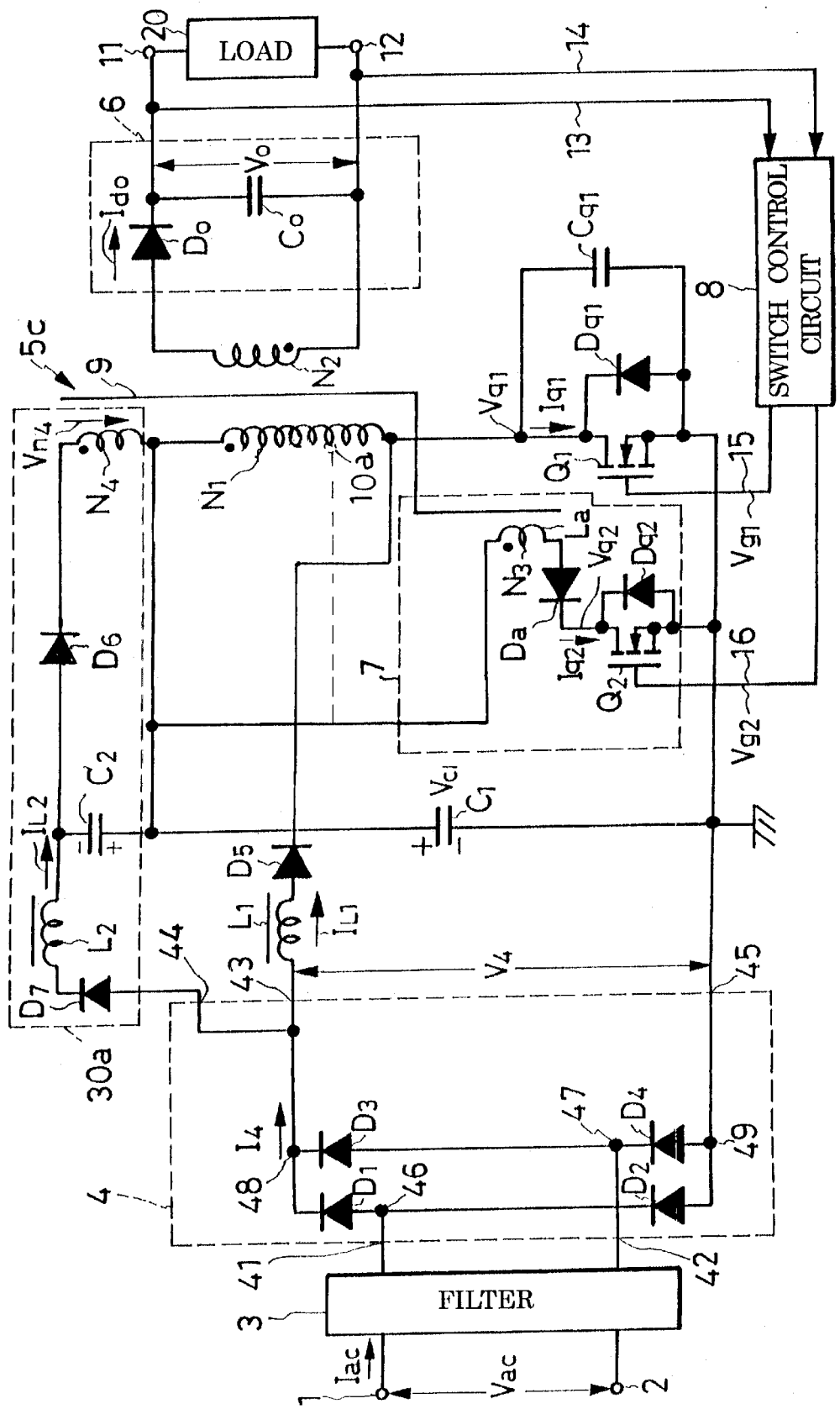
FIG. 14 is also a view similar to FIG. 1 but showing an eighth preferred form of switching power supply according to the invention.

Embodiment of FIG. 14

The transformer $5_b$ of the FIG. 13 switching power supply is replaceable by the transformer $5_c$ of the FIG. 12 device. FIG. 14 is an illustration of the resulting device, in which the primary inductor $L_1$ is connected via the reverse-blocking diode $D_5$ to the junction between transformer primary $N_1$ and primary switch $Q_1$ as in FIG. 12. This device gains the same advantages as do the FIGS. 12 and 13 embodiments.

Figure 15:
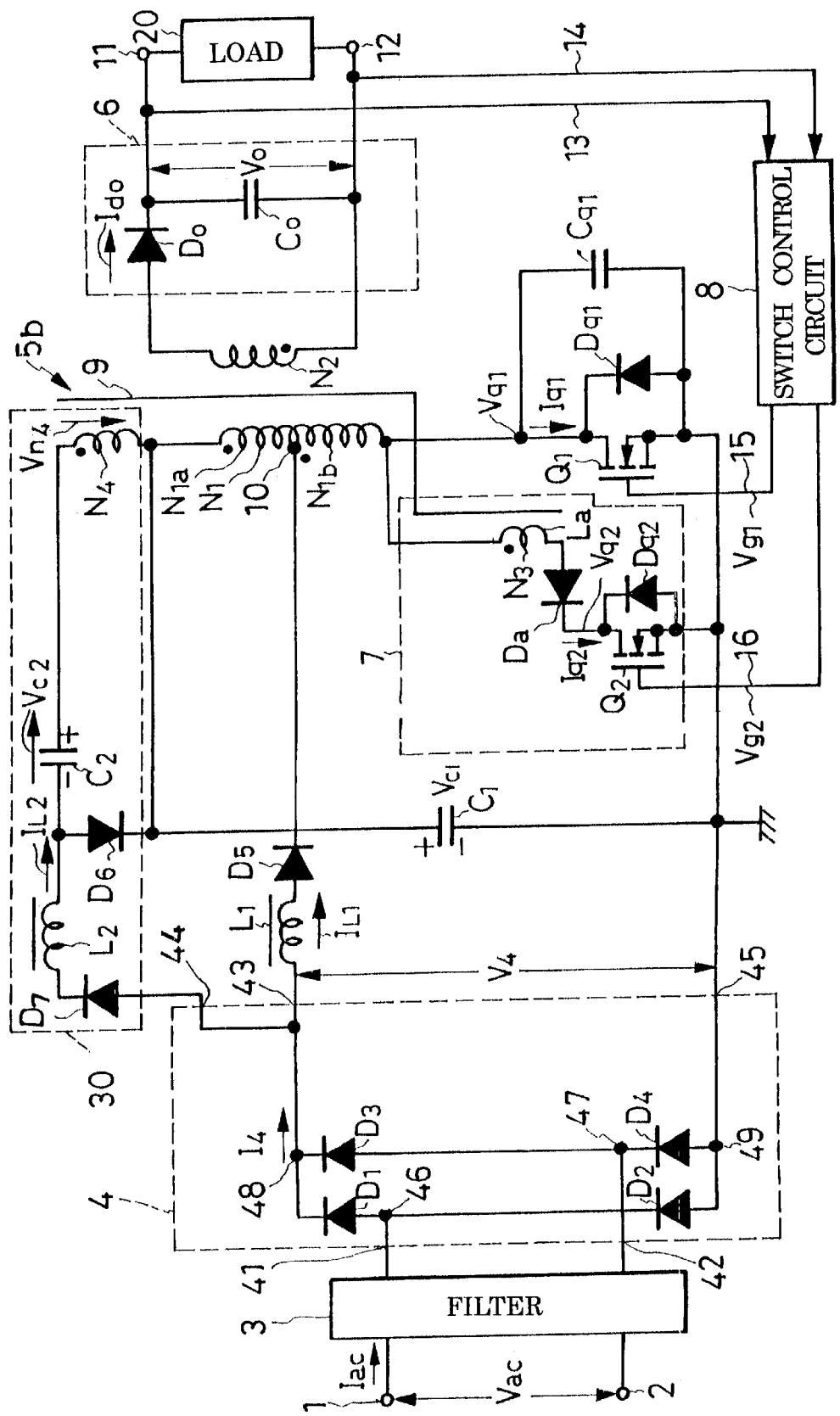
FIG. 15 is also a view similar to FIG. 1 but showing a ninth preferred form of switching power supply according to the invention.

Embodiment of FIG. 15

The ancillary charging circuit 30 and reverse-blocking diode $D_5$ of the FIG. 9 embodiment are applicable to the switching power supply of FIG. 7 as well. FIG. 15 shows the resulting device, which gains the advantages of both FIGS. 7 and 9 embodiments.

Figure 16:
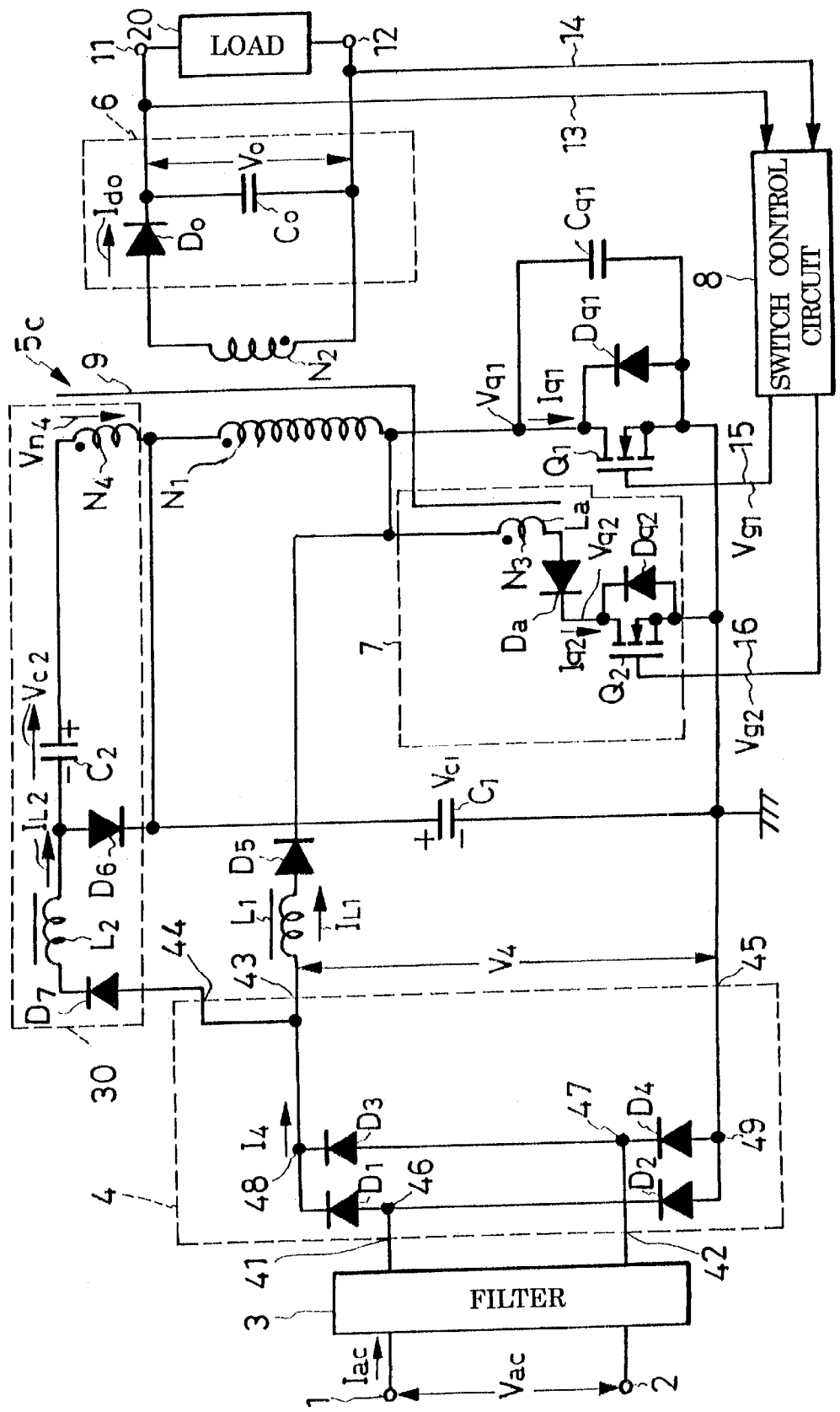
FIG. 16 is also a view similar to FIG. 1 but showing a tenth preferred form of switching power supply according to the invention.

Embodiment of FIG. 16

The FIG. 16 embodiment is similar to that of FIG. 15 except that the primary inductor $L_1$ is connected via the reverse-blocking diode $D_5$ to the junction between transformer primary $N_1$ and primary switch $Q_1$ as in the FIG. 12 embodiment. The transformer $5_c$ with the untapped primary $N_1$ is of the same construction as its FIG. 12 counterpart $5_c$. The resulting power supply with the soft-switching circuit 7 is similar to the FIG. 8 device, and the ancillary charging circuit 30 identical with that of FIG. 9, so that the FIG. 16 embodiment combines the advantages of the FIGS. 8 and 9 embodiments.

Figure 17:
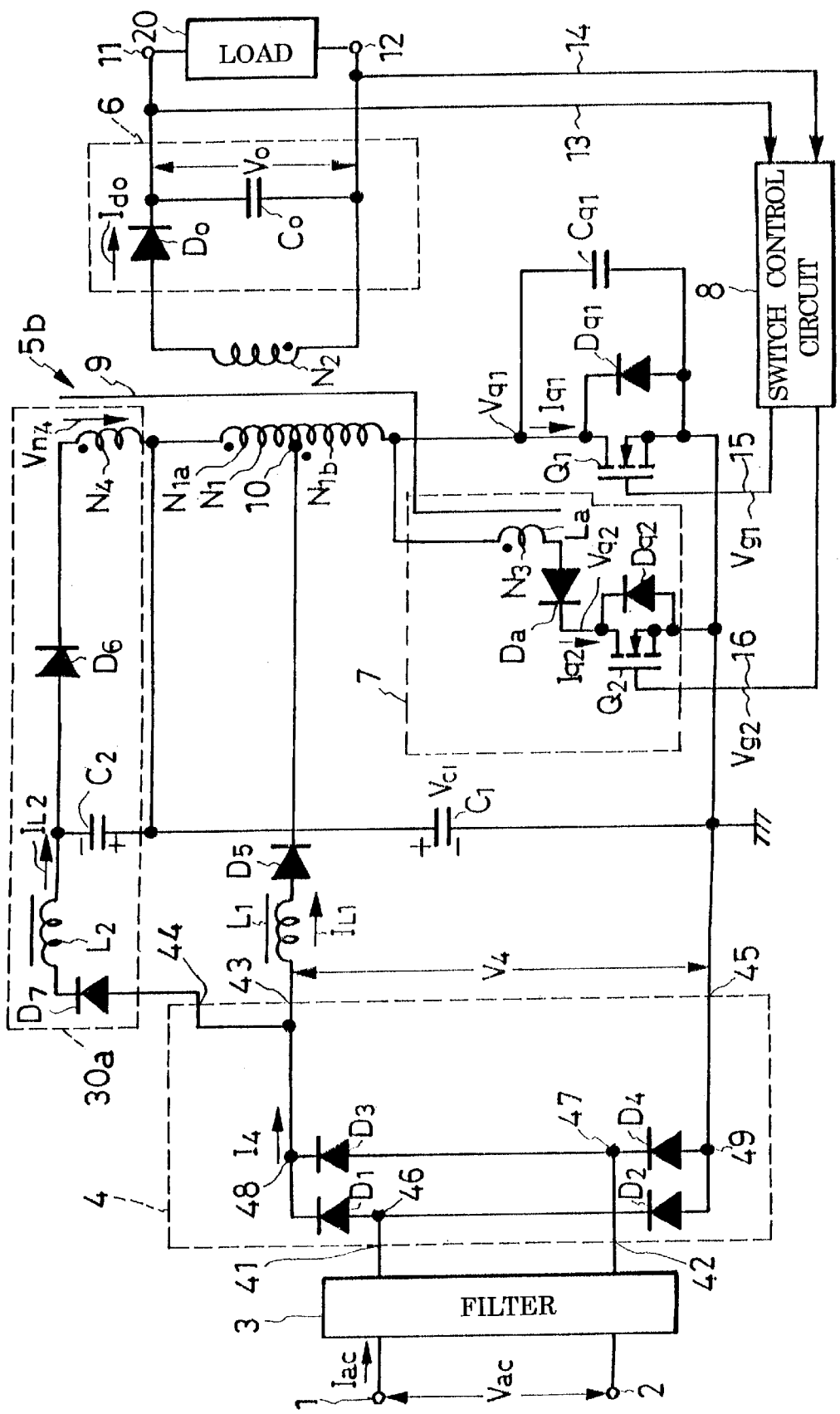
FIG. 17 is also a view similar to FIG. 1 but showing an eleventh preferred form of switching power supply according to the invention.

Embodiment of FIG. 17

The ancillary charging circuit 30 of the FIG. 15 embodiment is replaceable by its FIG. 13 counterpart $30_a$, as illustrated as a further preferred embodiment of the invention in FIG. 17. This FIG. 17 embodiment combines the advantages of the FIGS. 13 and 15 embodiments.

Figure 18:
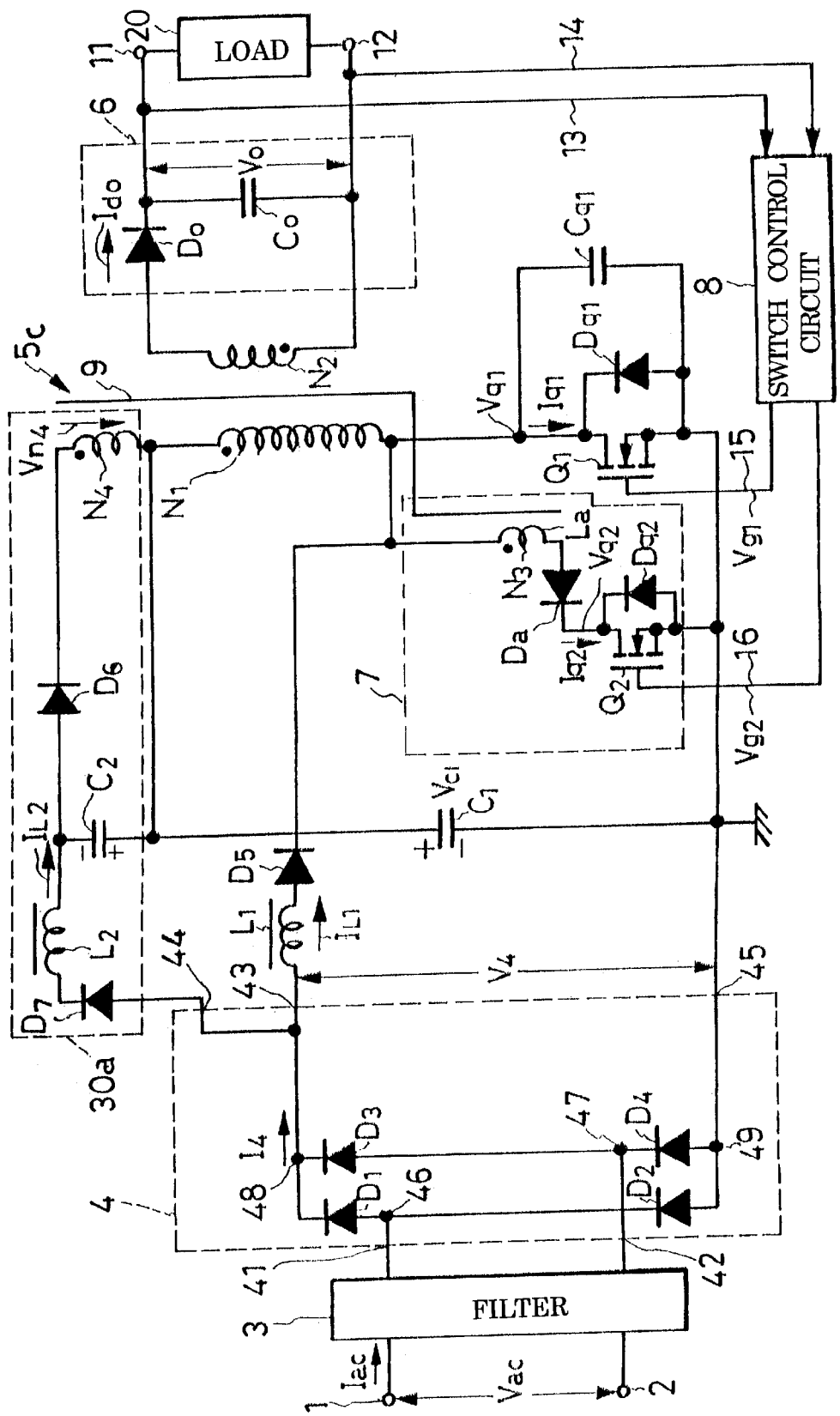
FIG. 18 is also a view similar to FIG. 1 but showing a twelfth preferred form of switching power supply according to the invention.

Embodiment of FIG. 18

In FIG. 18 the primary inductor $L_1$ is connected via the reverse-blocking diode $D_5$ to the junction between transformer primary $N_1$ and primary switch $Q_1$, as in FIG. 16. The transformer primary $N_1$ is therefore untapped. All the other details of construction are as set forth above with reference to FIG. 17. Having the same major circuitry, including the soft-switching circuit 7, as that of FIG. 8, and the same ancillary charging circuit $30_a$ as that of FIG. 13, this FIG. 18 embodiment combines the advantages of the FIGS. 8 and 13 embodiments.

Figure 19:
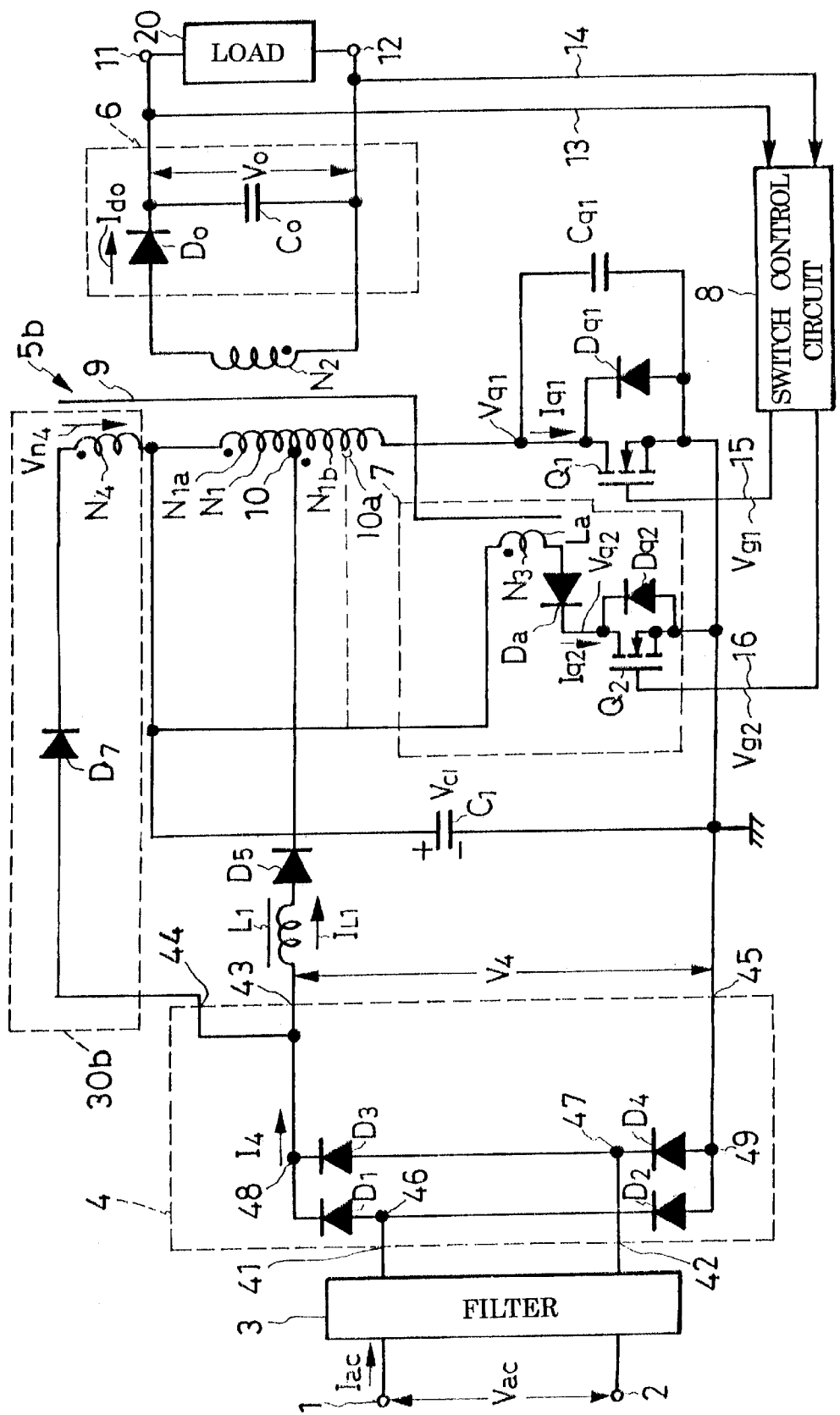
FIG. 19 is also a view similar to FIG. 1 but showing a thirteenth preferred form of switching power supply according to the invention.

Embodiment of FIG. 19

The ancillary charging circuit $30_a$ of FIG. 13 is modifiable as shown at $30_b$ in FIG. 19, which shows a further preferred embodiment of the invention that is similar in all the other respects to that of FIG. 13. The modified ancillary charging circuit $30_b$ incorporates only the transformer quaternary $N_4$ and ancillary charging diode $D_7$. Connected between the second rectifier output conductor 44 and smoothing capacitor $C_1$ via the ancillary charging diode $D_7$, the transformer quaternary $N_4$ is assumed to possess leakage inductance.

During the nonconducting periods of the switch $Q_1$, there will develop across the transformer quaternary $N_4$ a voltage $V_{n4}$ that is oriented to forwardly bias the ancillary charging diode $D_7$. Current will flow through the ancillary charging diode $D_7$, charging the smoothing capacitor $C_1$, only when the sum of the rectifier output voltage $V_4$ and the transformer quaternary voltage $V_{n4}$ grows higher than the voltage $V_{c1}$ across the smoothing capacitor $C_1$.

This FIG. 19 embodiment offers the same advantages as does that of FIG. 13 except for the lack of smoothing effects by the inductor $L_2$ and capacitor $C_2$ of the FIG. 13 ancillary charging circuit $30_a$. Counterbalancing this shortcoming are the simplicity in construction and compactness in size of the ancillary charging circuit $3_b$.

The FIG. 19 ancillary charging circuit $30_b$ lends itself to use with the transformer 5, of FIGS. 12 and 14. The cathode of the reverse-blocking diode $D_5$ may then be connected to the junction between transformer primary $N_1$ and primary switch $Q_1$ instead of to the tap 10 on the transformer primary. As an additional modification of the FIG. 19 embodiment, the soft-switching circuit 7 may be connected in parallel with the primary switch $Q_1$ as in the FIG. 7 embodiment. In short the ancillary charging circuit $30_b$ of FIG. 19 may be substituted for the ancillary charging circuit 30 or $30_a$ of FIGS. 9 and 12–18.

Figure 20:
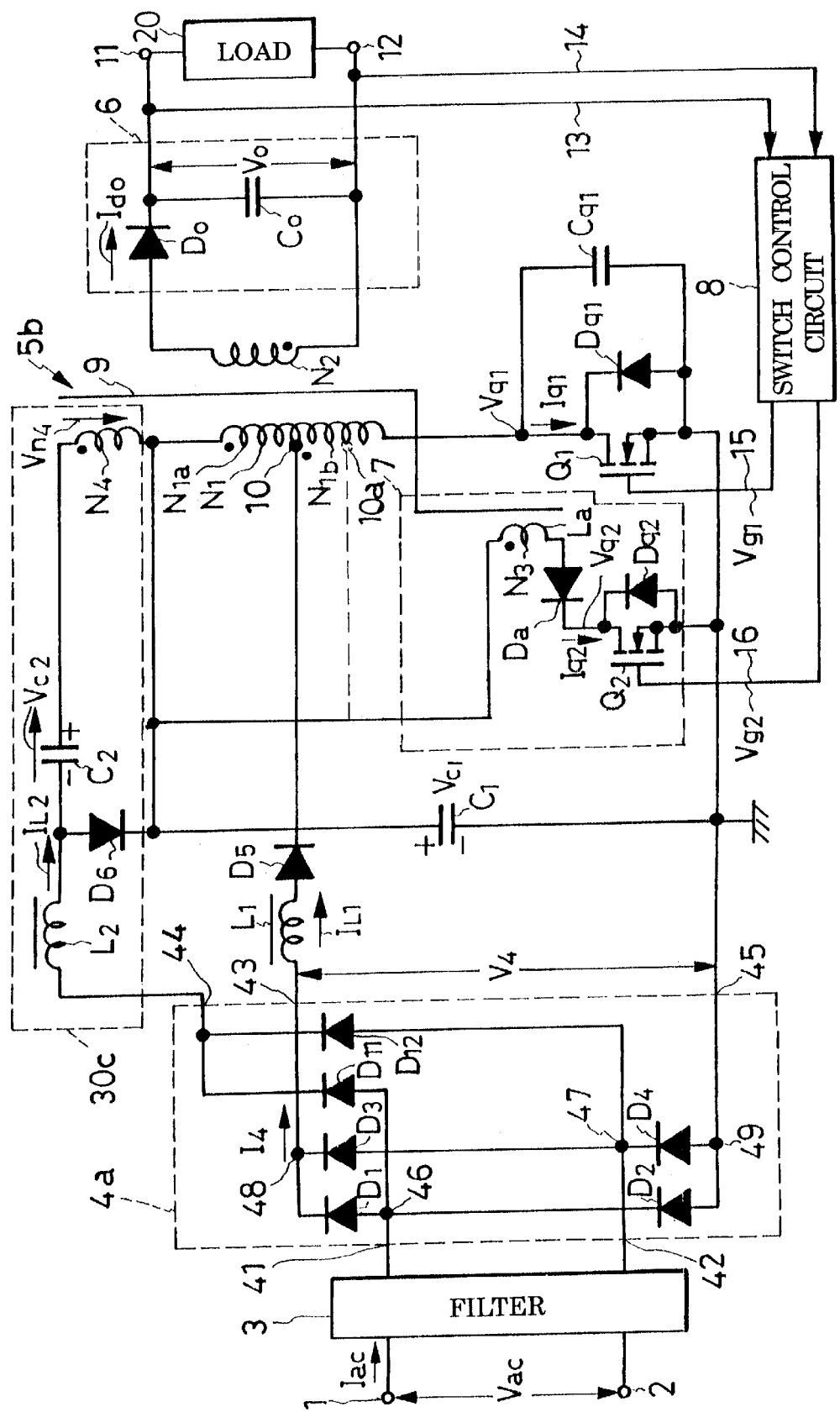
FIG. 20 is also a view similar to FIG. 1 but showing a fourteenth preferred form of switching power supply according to the invention.

Embodiment of FIG. 20

The switching power supply is here shown comprising a modified rectifier circuit $4_a$ and a modified ancillary charging circuit 30, in places of the rectifier circuit 4 and the ancillary charging circuit 30, respectively, of the FIG. 9 embodiment and is identical therewith in all the other respects. The modified rectifier circuit $4_a$ has two diodes $D_{11}$, and $D_{12}$ in addition to the four noted diodes $D_1$–$D_4$. The fifth diode $D_{11}$ has its anode connected to the first a.c. input conductor 41, and its cathode to the additional rectifier output conductor 44. The sixth diode $D_{12}$ has its anode connected to the second a.c. input conductor 42, and its cathode to the additional rectifier output conductor 44. The second rectifier output conductor 44 is therefore supplied not with the outputs from the first and third diodes $D_1$ and $D_3$ but with the outputs from fifth and sixth diodes $D_{11}$, and $D_{12}$. These diodes $D_{11}$, and $D_{12}$ are substantially equal in electrical characteristics to the diodes $D_1$ and $D_3$, so that the voltage between second rectifier output conductor 44 and ground-potential conductor 45 is substantially equal to the voltage $V_4$ between first rectifier output conductor 43 and ground-potential conductor 45.

The modified ancillary charging circuit $30_c$ is similar to the FIG. 9 ancillary charging circuit 30 except for the absence of the second ancillary charging diode $D_7$. The modified circuit $7_d$ will nevertheless function just like the original circuit 7 as the two additional diodes $D_{11}$ and $D_{12}$ of the rectifier circuit $4_a$ serve to block reverse current flow. It is understood that these additional diodes $D_{11}$ and $D_{12}$ are high-frequency diodes capable of responding to changes in the current through the ancillary inductor $L_2$ with the repeated conduction and nonconduction of the switch $Q_1$. The omission of the diode $D_7$ is inadvisable in cases where low-frequency diodes are used at $D_{11}$ and $D_{12}$.

The rectifier circuit $4_a$ and ancillary charging circuit $30_c$ of the FIG. 20 embodiment perform essentially the same functions as their FIG. 9 counterparts 4 and 30. The FIG. 20 embodiment thus wins the same advantages as that of FIG. 9. The rectifier circuit $4_a$ could be used in the FIGS. 12–19 embodiments as well.

Possible Modifications

Notwithstanding the foregoing detailed disclosure, it is not desired that the present invention be limited by the exact showing of the drawings or the description thereof. The following, then, is a brief list of possible modifications or alterations of the illustrated embodiments which are all considered to fall within the scope of the invention:

1. All the ancillary charging circuits 30, $3_a$, $30_b$ could do without the second ancillary diode $D_7$. In the absence of this second ancillary diode $D_7$ the a.c. input current $I_{ac}$ would flow during the $t_0$–$t_1$, $t_6$–$t_8$ and $t_9$–$t_{10}$ periods of FIG. 10 as well.
2. A high-frequency capacitor, with a capacitance less than that of the smoothing capacitor $C_1$, could be connected between the rectifier output conductors 43 and 44 in all the embodiments disclosed. In the FIG. 1 circuitry, for instance, the current flowing along the path comprising the primary inductor $L_1$, reverse-blocking diode $D_5$, transformer primary first part $N_{1a}$, smoothing capacitor $C_1$, and rectifier circuit 4 during the non-conducting periods of the primary switch $Q_1$ could be caused to bypass the rectifier circuit if such a high-frequency capacitor were incorporated. The result would be the elimination of noise due to the diodes $D_1$–$D_4$.
3. An autotransformer could be used in places of the transformers 5, $5_a$–$5_c$.
4. All the switching power supplies could do without the transformer secondary $N_2$, and the rectifying and smoothing circuit 6 could be connected in parallel with the primary switch $Q_1$ to provide a step-up power supply.
5. The reverse-blocking diode $D_5$ could be connected between first rectifier output conductor 43 and primary inductor $L_1$, or omitted in cases where reverse current flow would present no problem.
6. An insulated-gate bipolar transistor or any other suitable semiconductor switches could be used in place of the FET switch $Q_1$.
7. The invention could be applied to "forward" switching power supplies in which the diode $D_0$ on the output side of the transformer conducts during the conducting periods of the primary switch $Q_1$.
8. The soft-switching circuit 7 could be connected to a tap $10_a$ on the transformer primary $N_1$, as indicated by the broken lines in FIGS. 1, 6, 9, 12–14, 19 and 20, instead of to one extremity of the transformer primary.

What is claimed is:

1. A switching power supply capable of translating a.c. voltage into d.c. voltage, comprising:
   (a) a pair of a.c. input terminals for inputting a.c. voltage having a known frequency;
   (b) a pair of d.c. output terminals for outputting d.c. voltage;
   (c) a rectifier circuit connected to the pair of input terminals for rectifying the a.c. input voltage, the rectifier circuit having a first and a second output;
   (d) a transformer connected to the pair of a.c. input terminals via the rectifier circuit on one hand and, on the other hand, to the pair of d.c. output terminals, the transformer having a primary and an ancillary winding;
   (e) a rectifying and smoothing circuit connected between the transformer and the pair of d.c. output terminals for providing the d.c. output voltage;

(f) a smoothing capacitor connected between a first extremity of the primary winding of the transformer and the second output of the rectifier circuit;

(g) an inductor connected between the first output of the rectifier circuit and the smoothing capacitor via at least part of the primary winding of the transformer;

(h) a primary switch connected between a second extremity of the primary winding of the transformer and the second output of the rectifier circuit;

(i) soft-switching capacitance means associated with the primary switch;

(j) an ancillary switch connected in parallel with the smoothing capacitor via at least the ancillary winding of the transformer for supplying to the ancillary winding a current of sufficient magnitude to cause the primary winding of the transformer to develop a voltage that enables the soft-switching capacitance means to discharge; and (k) a switch control circuit connected to the primary switch for on-off control of the primary switch at a repetition frequency higher than the frequency of the a.c. input voltage, the switch control circuit being also connected to the ancillary switch in order to initiate conduction through the ancillary switch earlier than the beginning of each conducting period of the primary switch and to terminate conduction through the ancillary switch not later than the end of each conducting period of the primary switch.

2. The switching power supply of claim 1 wherein the ancillary switch is connected in parallel with the smoothing capacitor via the ancillary winding of the transformer and at least part of the primary winding of the transformer.

3. The switching power supply of claim 1 further comprising a diode connected in series with the ancillary winding of the transformer and with the ancillary switch in order to prevent reverse current flow.

4. The switching power supply of claim 1 wherein the rectifier circuit has a third output for putting out substantially the same rectifier output voltage between itself and the second output of the rectifier circuit as that between the first and the second output of the rectifier circuit, and wherein an ancillary charging circuit is provided which comprises a second ancillary winding of the transformer, the second ancillary winding being connected between the third output of the rectifier circuit and the smoothing capacitor and electromagnetically coupled to the primary winding of the transformer for providing a voltage for charging the smoothing capacitor.

5. The switching power supply of claim 4 wherein the ancillary charging circuit further comprises:

(a) a second inductor connected between the third output of the rectifier circuit and the second ancillary winding of the transformer;

(b) an ancillary charging capacitor connected between the second inductor and the second ancillary winding of the transformer; and (c) an ancillary charging diode connected in parallel with the serial connection of the ancillary charging capacitor and the second ancillary winding of the transformer.

6. The switching power supply of claim 5 wherein the ancillary charging circuit further comprises a reverse-blocking diode connected in series with the second inductor.

7. The switching power supply of claim 4 wherein the ancillary charging circuit further comprises:

(a) a second inductor connected between the third output of the rectifier circuit and the second ancillary winding of the transformer;

(b) an ancillary charging diode connected between the second inductor and the second ancillary winding of the transformer; and (c) an ancillary charging capacitor connected in parallel with the serial connection of the ancillary charging diode and the second ancillary winding of the transformer.

8. The switching power supply of claim 7 wherein the ancillary charging circuit further comprises a reverse-blocking diode connected in series with the second inductor.

9. The switching power supply of claim 4 wherein the ancillary charging circuit further comprises a reverse-blocking diode connected between the third output of the rectifier circuit and the second ancillary winding of the transformer.

10. The switching power supply of claim 4 further comprising a reverse-blocking diode connected in series with the inductor.

11. The switching power supply of claim 4 wherein the rectifier circuit comprises:

(a) a first diode having a first electrode connected to one of the pair of a.c. input terminals, and a second electrode connected to the first and the third output of the rectifier circuit;

(b) a second diode having a first electrode connected to the second output of the rectifier circuit, and a second electrode connected to said one a.c. input terminal;

(c) a third diode having a first electrode connected to the other of the pair of a.c. input terminals, and a second electrode connected to the first and the third output of the rectifier circuit; and (d) a fourth diode having a first electrode connected to the second output of the rectifier circuit, and a second electrode connected to said other a.c. input terminal.

12. The switching power supply of claim 4 wherein the rectifier circuit comprises:

(a) a first diode having a first electrode connected to one of the pair of a.c. input terminals, and a second electrode connected to the first output of the rectifier circuit;

(b) a second diode having a first electrode connected to the second output of the rectifier circuit, and a second electrode connected to said one a.c. input terminal;

(c) a third diode having a first electrode connected to the other of the pair of a.c. input terminals, and a second electrode connected to the first output of the rectifier circuit;

(d) a fourth diode having a first electrode connected to the second output of the rectifier circuit, and a second electrode connected to said other a.c. input terminal;

(e) a fifth diode having a first electrode connected to said one a.c. input terminal, and a second electrode connected to the third output of the rectifier circuit; and (f) a sixth diode having a first electrode connected to said other a.c. input terminal, and a second electrode connected to the third output of the rectifier circuit.

13. The switching power supply of claim 1 wherein the primary winding of the transformer has a tap, and wherein the inductor is connected between the first output of the rectifier circuit and the tap of the transformer primary winding.

14. The switching power supply of claim 1 wherein the inductor is connected between the first output of the rectifier circuit and a junction between the primary winding of the transformer and the primary switch.

* * * * *

UNITED STATES PATENT AND TRADEMARK OFFICE
CERTIFICATE OF CORRECTION

PATENT NO.   : 6,680,854 B2
DATED        : January 20, 2004
INVENTOR(S)  : Koichi Morita and Toshiyuki Yamagishi It is certified that error appears in the above-identified patent and that said Letters Patent is hereby corrected as shown below:

Column 6,
Line 31, delete the second occurrence of "of the";

Column 14,
Line 27, delete "14" and insert -- $I_4$ -- therefor;

Column 15,
Line 65, delete "$IL_1$" and insert -- $I_{L1}$ -- therefor;
Line 67, delete "Ton" and insert -- $T_{on}$ -- therefor;

Column 17,
Line 47, delete "5," and insert -- $\mathbf{5_c}$ -- therefor;

Column 19,
Line 41, delete "30," and insert -- $\mathbf{30_c}$ -- therefor;
Lines 45 and 54, delete "$D_{11}$," and insert -- $D_{11}$ -- therefor.

Signed and Sealed this

Thirteenth Day of April, 2004

JON W. DUDAS
*Acting Director of the United States Patent and Trademark Office*